US010281692B2

(12) United States Patent
Saori

(10) Patent No.: US 10,281,692 B2
(45) Date of Patent: May 7, 2019

(54) ZOOM LENS SYSTEM AND ELECTRONIC IMAGING APPARATUS USING THE SAME

(71) Applicant: RICOH IMAGING COMPANY, LTD., Tokyo (JP)

(72) Inventor: Masakazu Saori, Saitama (JP)

(73) Assignee: RICOH IMAGING COMPANY, LTD., Tokyo (JP)

( * ) Notice: Subject to any disclaimer, the term of this patent is extended or adjusted under 35 U.S.C. 154(b) by 0 days.

(21) Appl. No.: 15/632,816

(22) Filed: Jun. 26, 2017

(65) Prior Publication Data

US 2017/0293112 A1 Oct. 12, 2017

Related U.S. Application Data

(62) Division of application No. 13/777,110, filed on Feb. 26, 2013, now Pat. No. 9,690,083.

(30) Foreign Application Priority Data

Mar. 2, 2012 (JP) .................................. 2012-046297
Dec. 19, 2012 (JP) .................................. 2012-277049

(51) Int. Cl.
*G02B 15/14* (2006.01)
*G02B 15/22* (2006.01)
(Continued)

(52) U.S. Cl.
CPC ........... *G02B 13/009* (2013.01); *G02B 15/14* (2013.01); *G02B 15/173* (2013.01); *G02B 15/20* (2013.01);
(Continued)

(58) Field of Classification Search
CPC ........ G02B 15/00; G02B 15/14; G02B 15/15; G02B 15/16; G02B 15/167; G02B 15/173; G02B 15/20; G02B 15/22; G02B 15/28

See application file for complete search history.

(56) References Cited

U.S. PATENT DOCUMENTS

| 4,368,954 A | | 1/1983 | Tsuji | |
|---|---|---|---|---|
| 4,504,125 A | * | 3/1985 | Fujii | ..................... G02B 15/173 359/687 |

(Continued)

FOREIGN PATENT DOCUMENTS

| JP | 61-249016 | 11/1986 |
|---|---|---|
| JP | 62-021113 | 1/1987 |

(Continued)

OTHER PUBLICATIONS

Office Action issued in Japan Counterpart Patent Appl. No. 2012-277049, dated Aug. 2, 2016, along with an english translation thereof.

*Primary Examiner* — Thong Q Nguyen
(74) *Attorney, Agent, or Firm* — Greenblum & Bernstein, P.L.C.

(57) ABSTRACT

A zoom lens system includes a positive first lens group, a negative second lens group, and positive third and fourth lens groups, in that order from the object side. Upon zooming from the short to long focal length extremities, the first lens group does not move along the optical axis direction, and the second lens group and the third lens group are movable in the optical axis direction. The first lens group includes at least one negative lens element, and the following conditions are satisfied:

$\nu d1n < 22.85$ and (Continued)

$-8.0 < f3/f2 < -3.0$, wherein vd1n designates the Abbe number, with respect to the d-line, of the negative lens element, which is provided closest to the object side within the first lens group, and f2 and f3 designate the focal lengths of the second and third lens groups, respectively.

5 Claims, 29 Drawing Sheets

(51) Int. Cl.
  *G02B 13/00* (2006.01)
  *G02B 15/24* (2006.01)
  *G02B 15/173* (2006.01)
  *G02B 15/20* (2006.01)
  *H04N 5/232* (2006.01)

(52) U.S. Cl.
  CPC ............ *G02B 15/22* (2013.01); *G02B 15/24* (2013.01); *H04N 5/23296* (2013.01)

(56) References Cited

U.S. PATENT DOCUMENTS

| | | | |
|---|---|---|---|
| 4,641,928 A * | 2/1987 | Hamanishi | G02B 15/173 359/687 |
| 4,934,795 A | 6/1990 | Estelle | |
| 5,054,898 A | 10/1991 | Kitagishi et al. | |
| 5,059,007 A | 10/1991 | Tanaka | |
| 5,272,564 A | 12/1993 | Suzuki et al. | |
| 5,572,276 A | 11/1996 | Hirakawa | |
| 5,719,708 A | 2/1998 | Nagaoka | |
| 6,002,528 A | 12/1999 | Tomita | |
| 7,068,429 B1 | 6/2006 | Ori | |
| 7,085,069 B2 | 8/2006 | Toyama | |
| 7,394,599 B2 | 7/2008 | Kawakami et al. | |
| 7,672,063 B2 | 3/2010 | Take | |
| 7,982,971 B2 | 7/2011 | Nakamura | |
| 9,690,083 B2 * | 6/2017 | Saori | G02B 15/173 |
| 2002/0101661 A1 | 8/2002 | Harada | |
| 2006/0279853 A1 | 12/2006 | Morooka | |
| 2007/0188888 A1 | 8/2007 | Saori | |
| 2008/0198474 A1 | 8/2008 | Morooka | |
| 2008/0297901 A1 | 12/2008 | Mitsuki | |
| 2009/0109548 A1 | 4/2009 | Kimura | |
| 2009/0135498 A1 | 5/2009 | Take | |
| 2009/0296231 A1 | 12/2009 | Shirasuna | |
| 2009/0303596 A1 | 12/2009 | Ryu | |
| 2010/0194969 A1 | 8/2010 | Sakamoto | |
| 2011/0176225 A1 | 7/2011 | Shinohara et al. | |
| 2012/0063003 A1 | 3/2012 | Li | |
| 2012/0200923 A1 | 8/2012 | Mitsuki | |
| 2012/0229689 A1 | 9/2012 | Saori | |

FOREIGN PATENT DOCUMENTS

| | | |
|---|---|---|
| JP | 01-222212 | 9/1989 |
| JP | 02-239216 | 9/1990 |
| JP | 06-51202 | 2/1994 |
| JP | 08-160299 | 6/1996 |
| JP | 2002-006215 | 1/2002 |
| JP | 2002-162564 | 6/2002 |
| JP | 2006-195068 | 7/2006 |
| JP | 2006-343622 | 12/2006 |
| JP | 2007-212830 | 8/2007 |
| JP | 2007-279541 | 10/2007 |
| JP | 2009-009104 | 1/2009 |
| JP | 2009-109630 | 5/2009 |
| JP | 2009-115874 | 5/2009 |
| JP | 2009-288619 | 12/2009 |

* cited by examiner

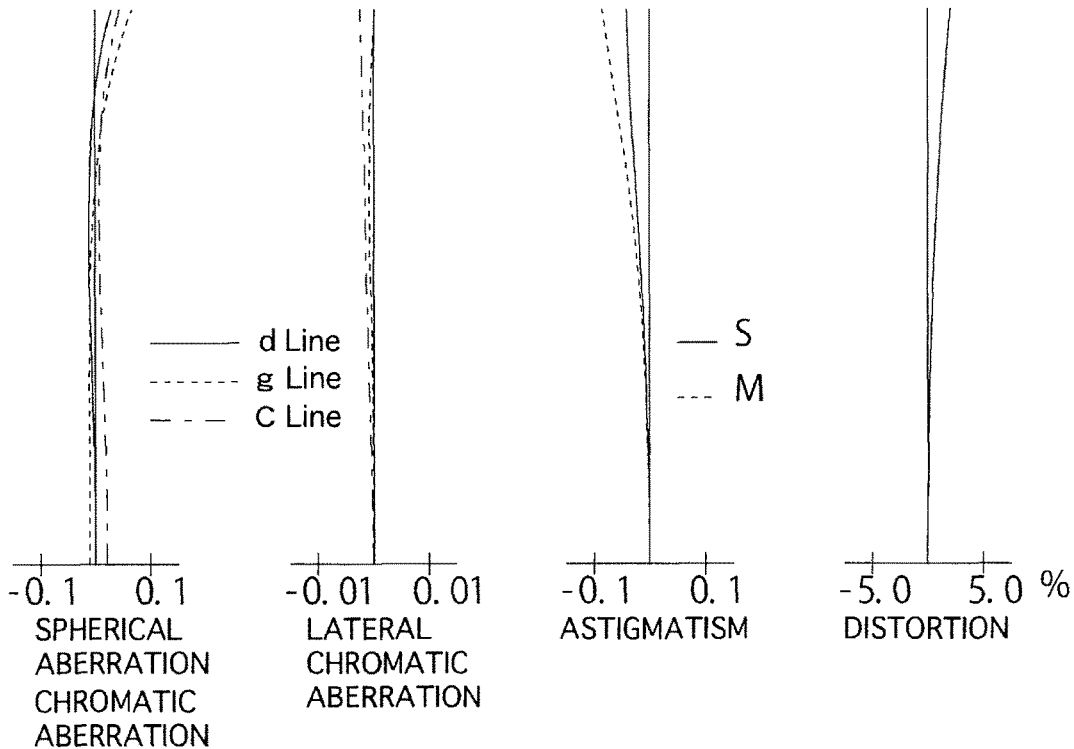
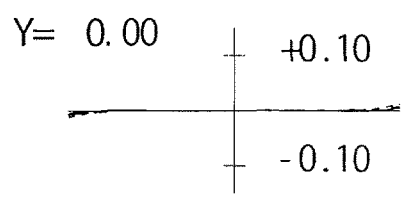
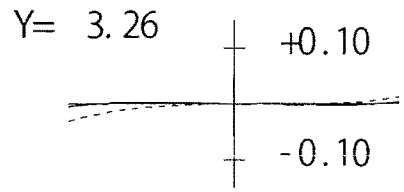
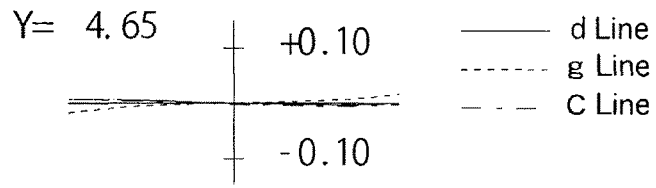

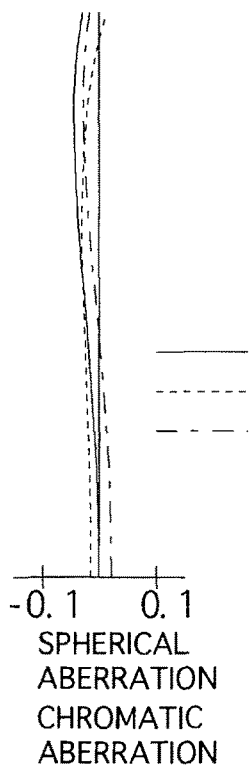
Fig. 5A
FNO.=1:2.8
—— d Line
----- g Line
--- C Line
-0.1  0.1
SPHERICAL
ABERRATION
CHROMATIC
ABERRATION
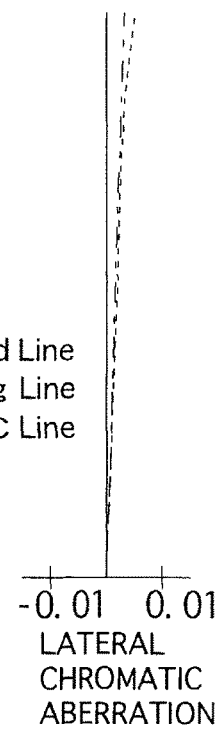
Fig. 5B
Y=4.65
-0.01  0.01
LATERAL
CHROMATIC
ABERRATION
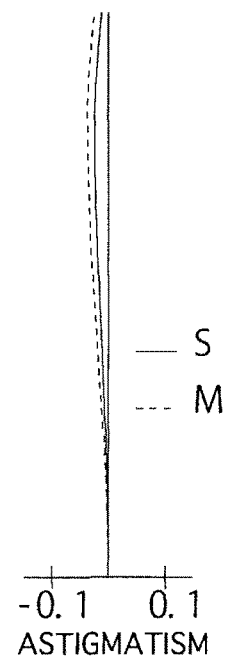
Fig. 5C
Y=4.65
—— S
--- M
-0.1  0.1
ASTIGMATISM
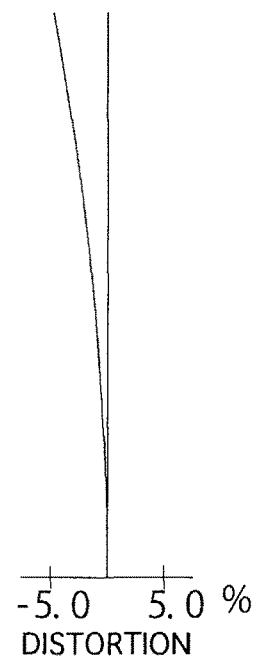
Fig. 5D
Y=4.65
-5.0  5.0 %
DISTORTION
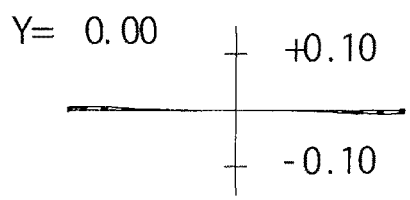
Fig. 6A   Y= 0.00   +0.10 / -0.10
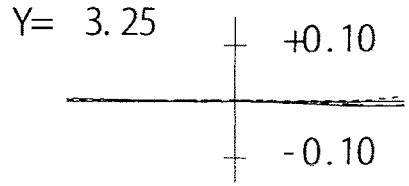
Fig. 6B   Y= 3.25   +0.10 / -0.10
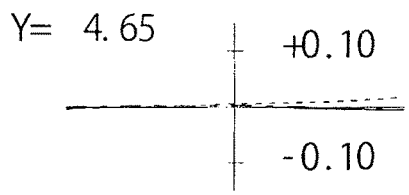
Fig. 6C   Y= 4.65   +0.10 / -0.10
—— d Line
----- g Line
--- C Line

FNO.=1:2.9 d Line
g Line
C Line
SPHERICAL ABERRATION CHROMATIC ABERRATION

Y=4.65

LATERAL CHROMATIC ABERRATION

Y=4.65

S
M
ASTIGMATISM

Y=4.65

DISTORTION

Y= 0.00

Y= 3.25

Y= 4.65 d Line
g Line
C Line

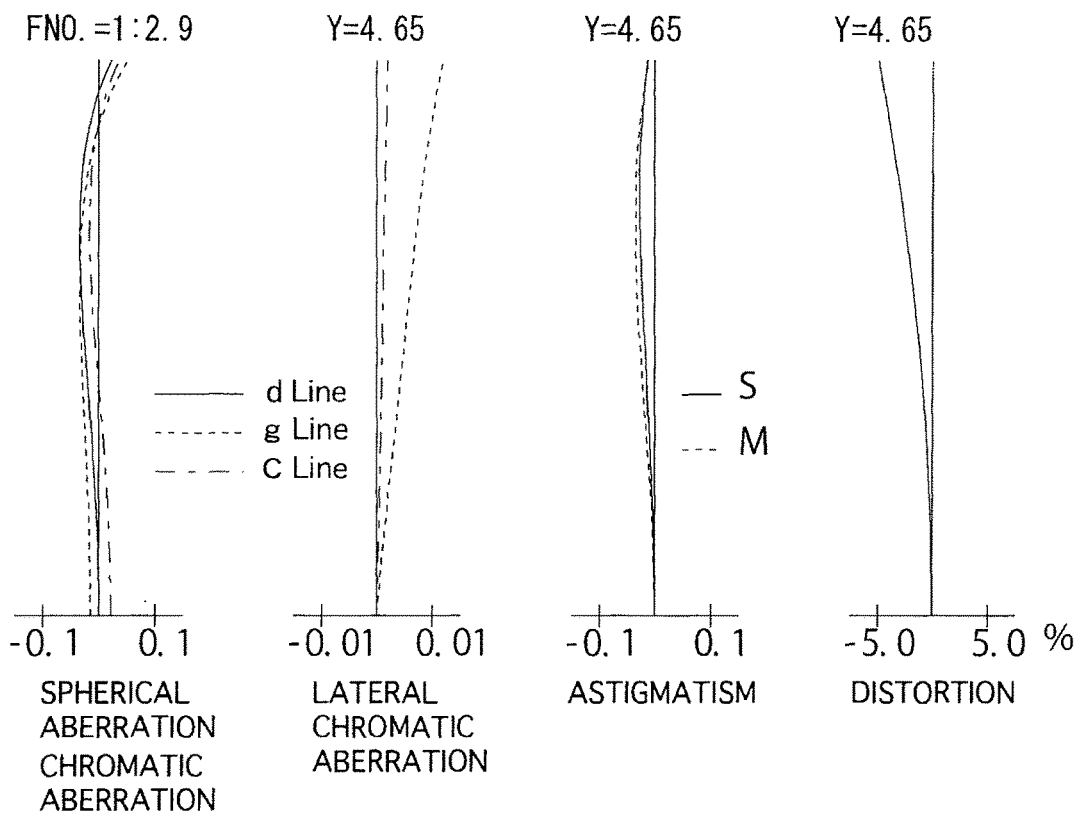
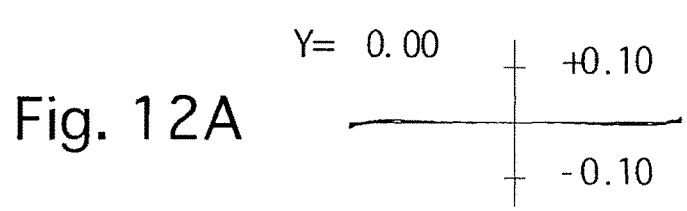
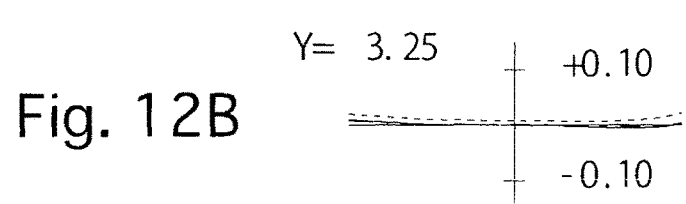
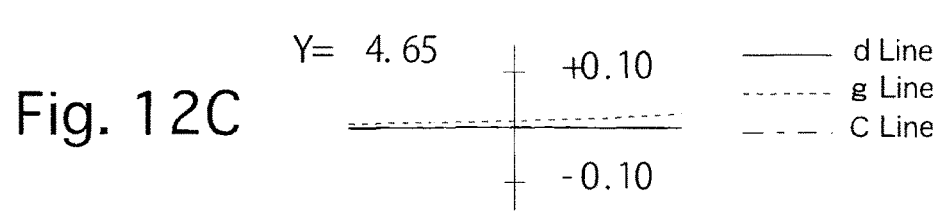

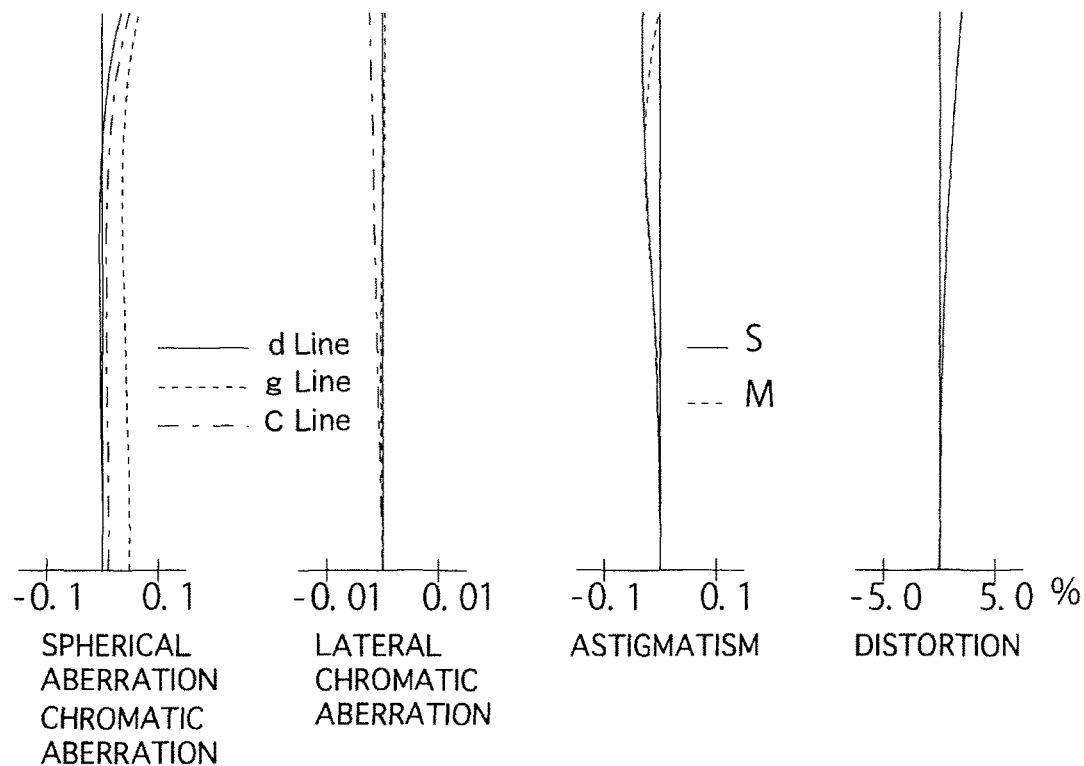
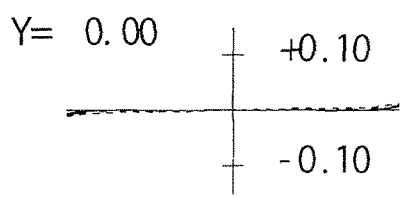
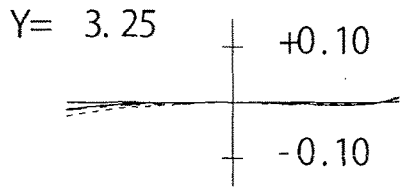
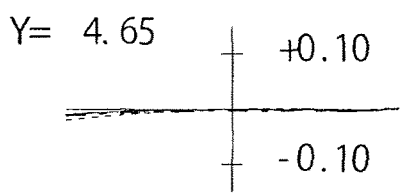

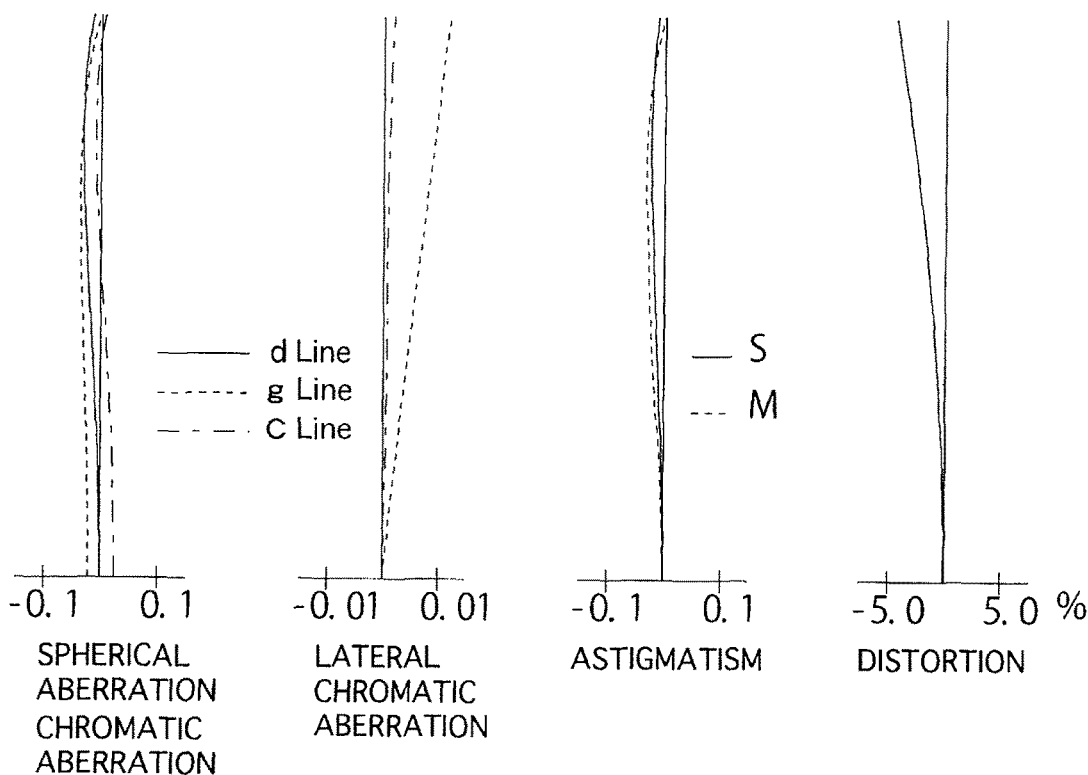
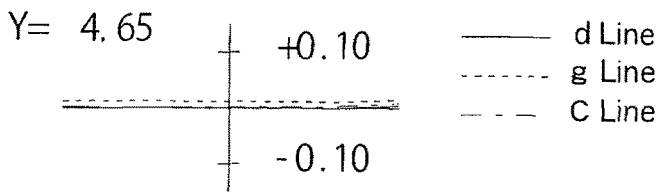

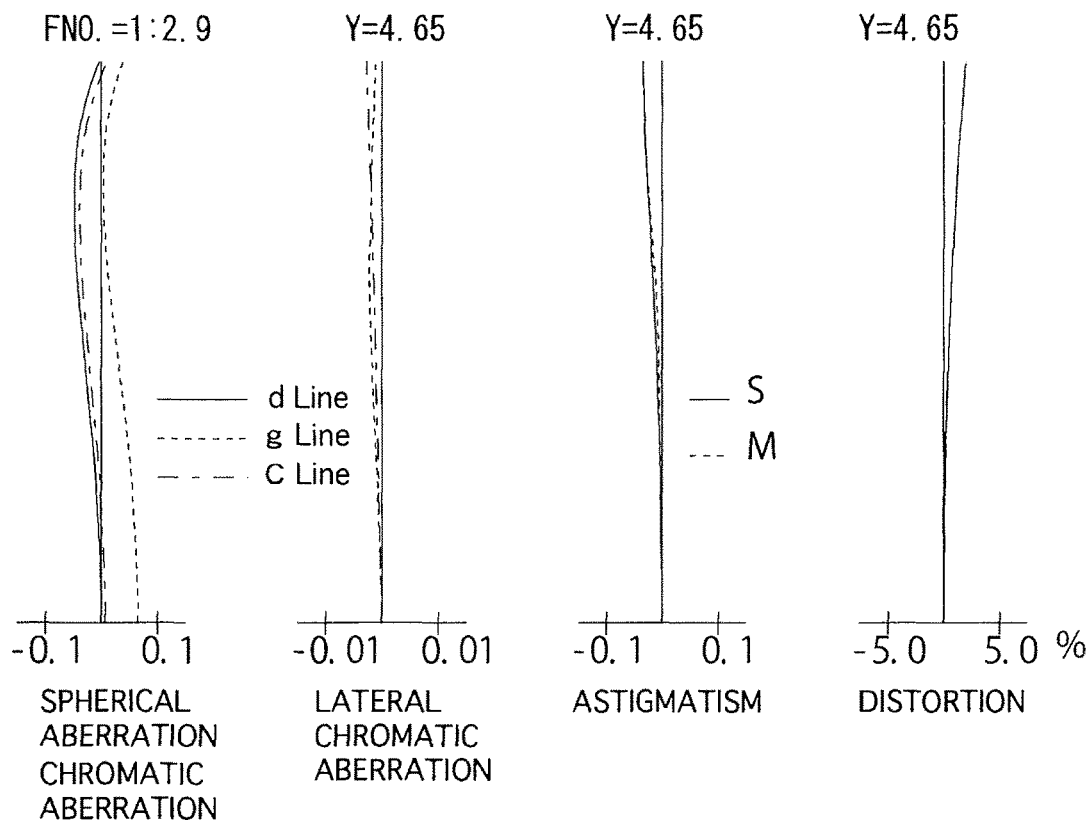
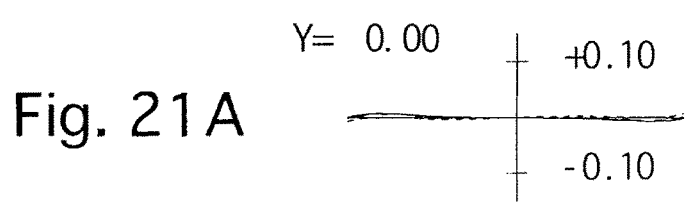
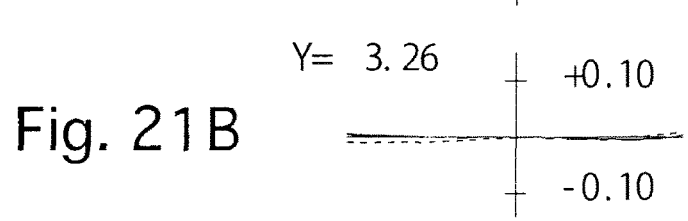
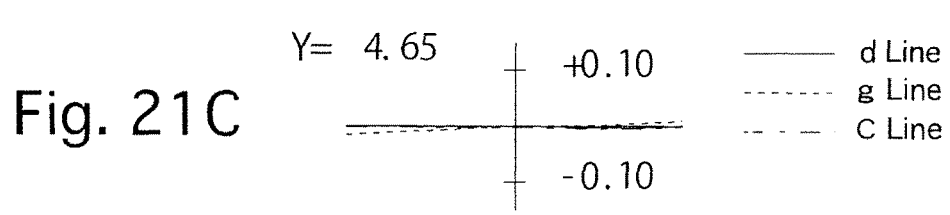

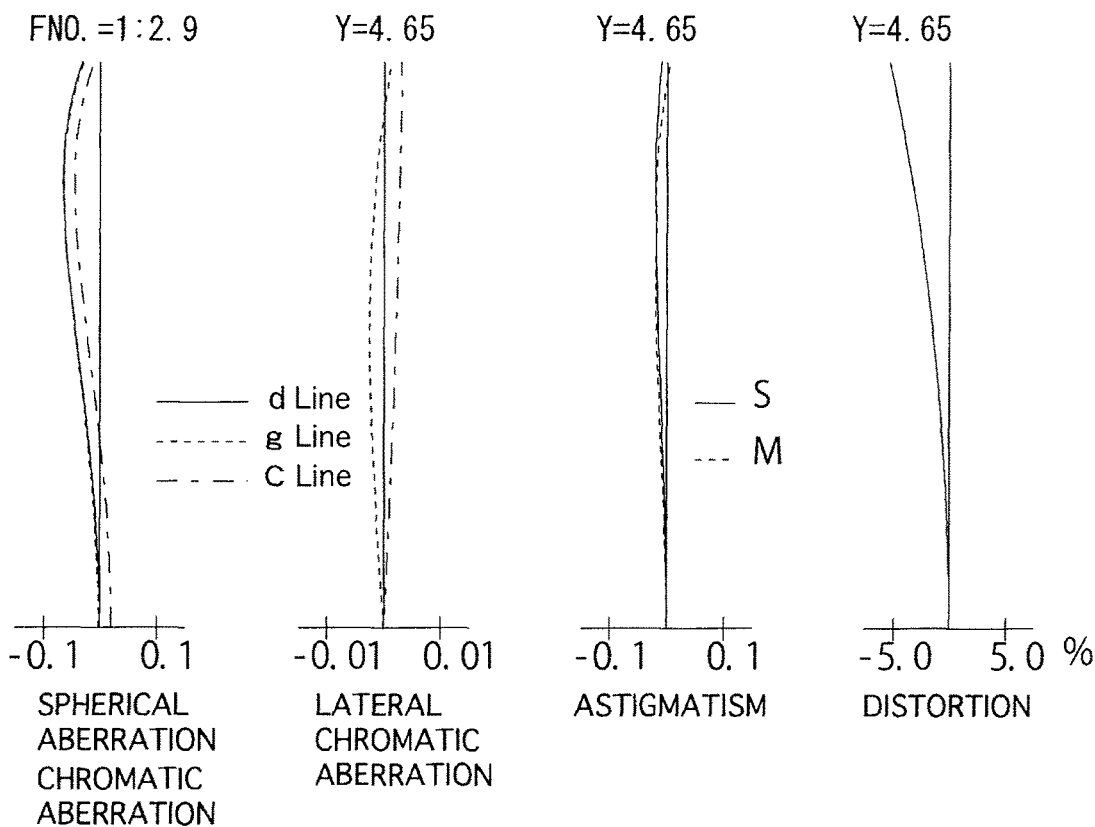

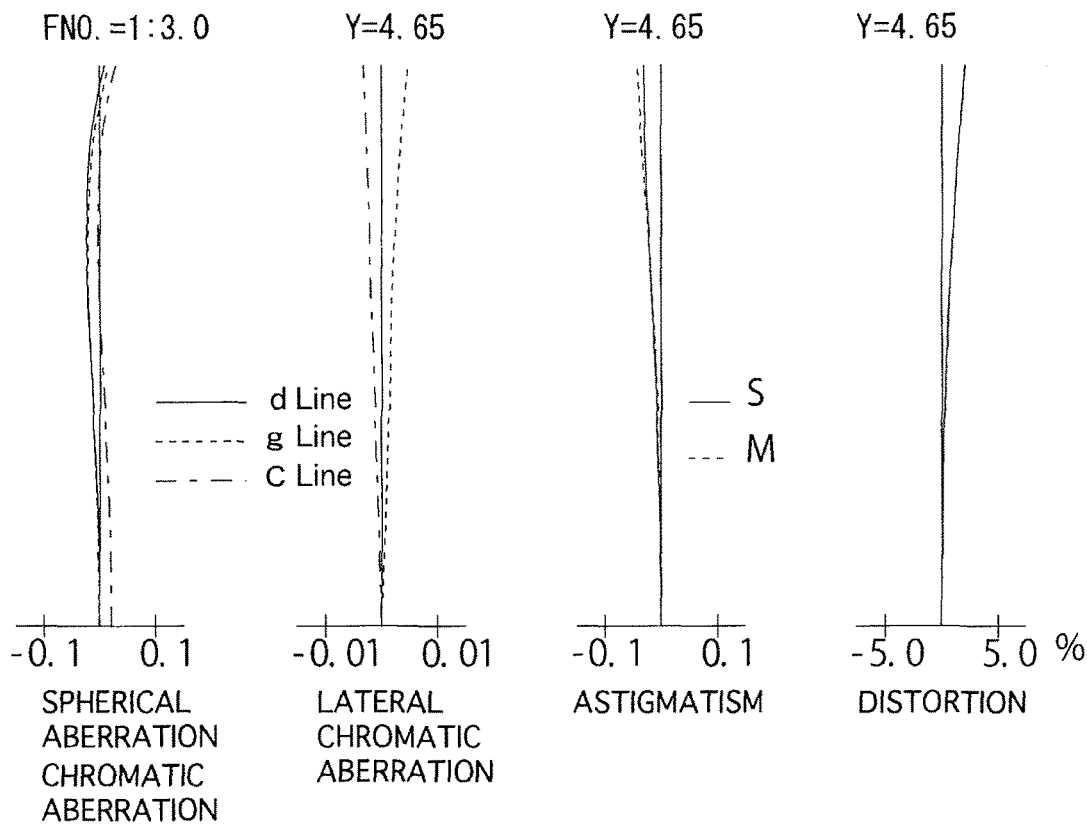
Fig. 26A FNO.=1:3.0 — SPHERICAL ABERRATION CHROMATIC ABERRATION
Fig. 26B Y=4.65 — LATERAL CHROMATIC ABERRATION
Fig. 26C Y=4.65 — ASTIGMATISM
Fig. 26D Y=4.65 — DISTORTION
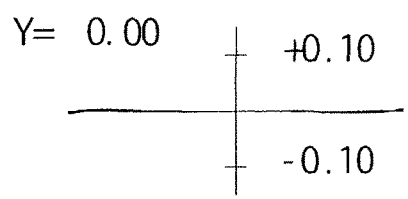
Fig. 27A  Y= 0.00
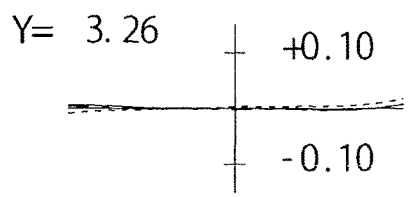
Fig. 27B  Y= 3.26
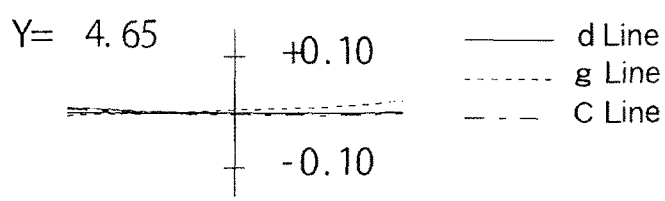
Fig. 27C  Y= 4.65

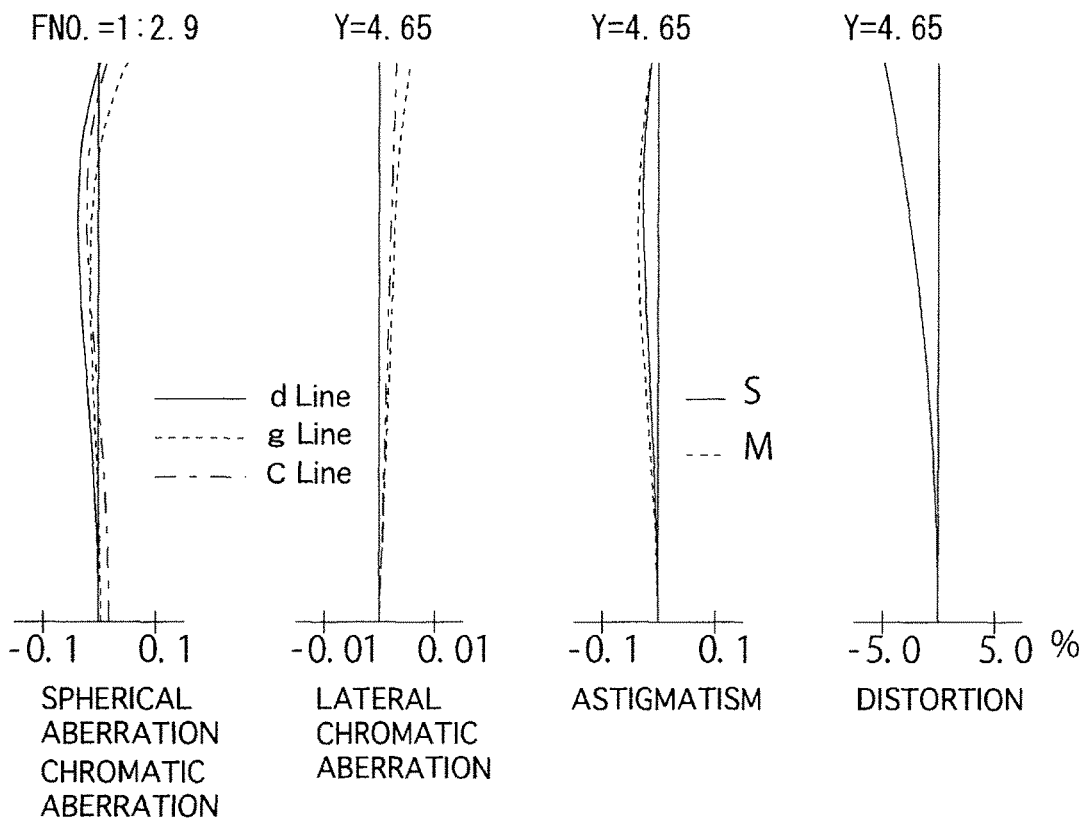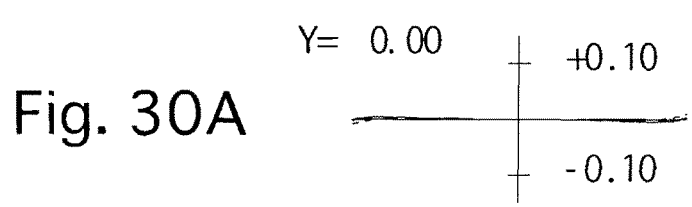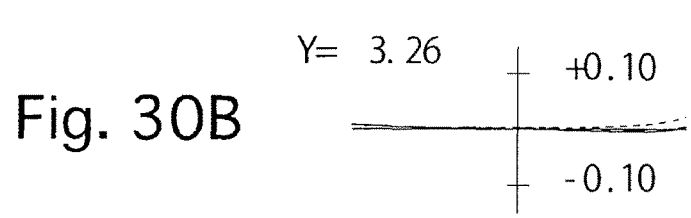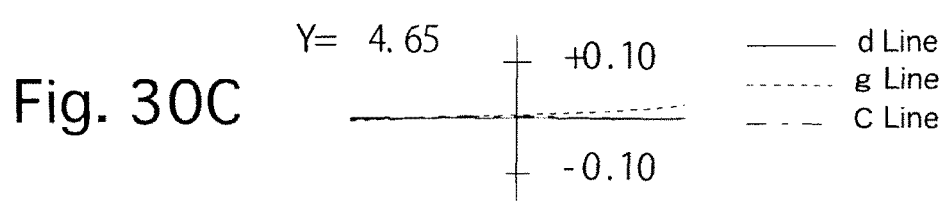

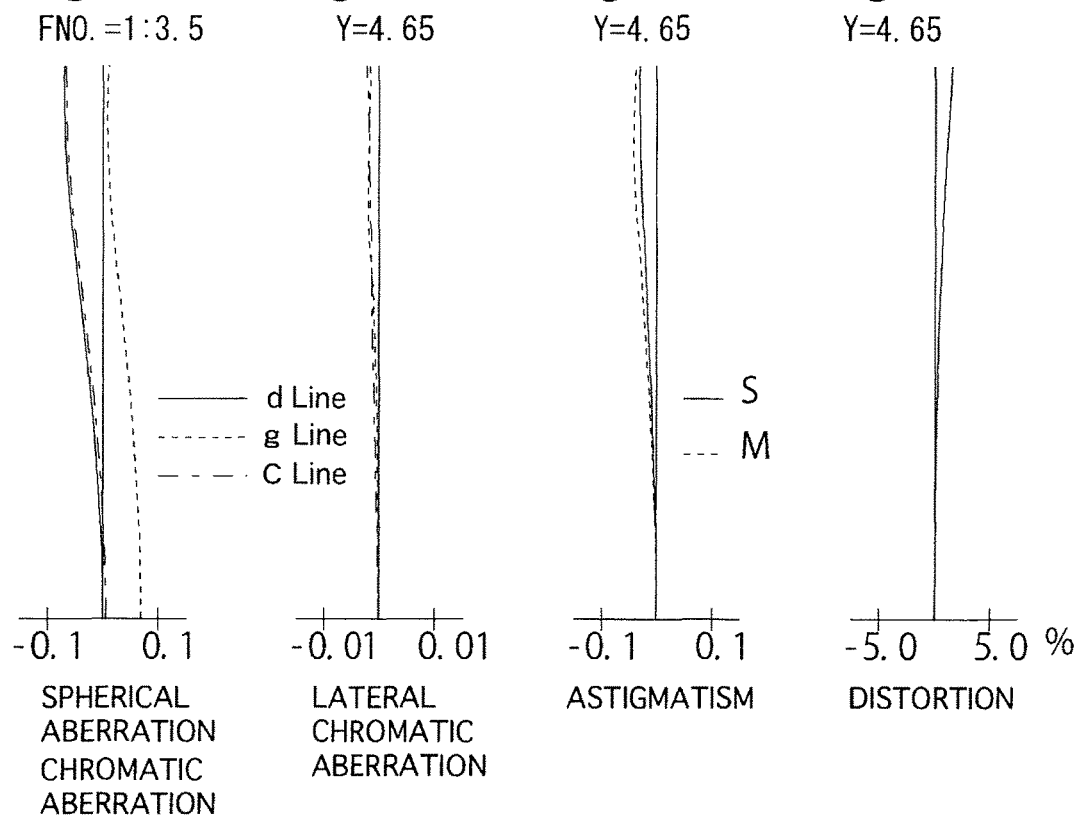
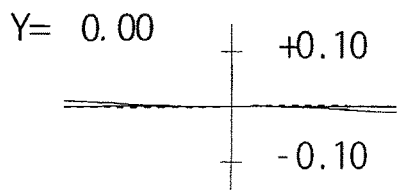
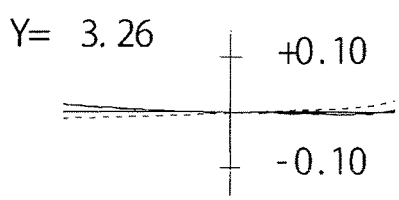
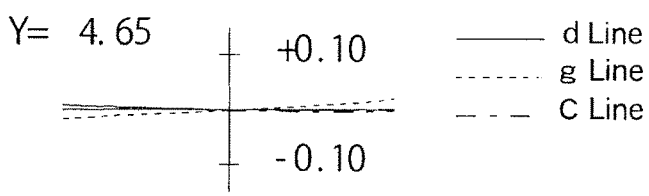

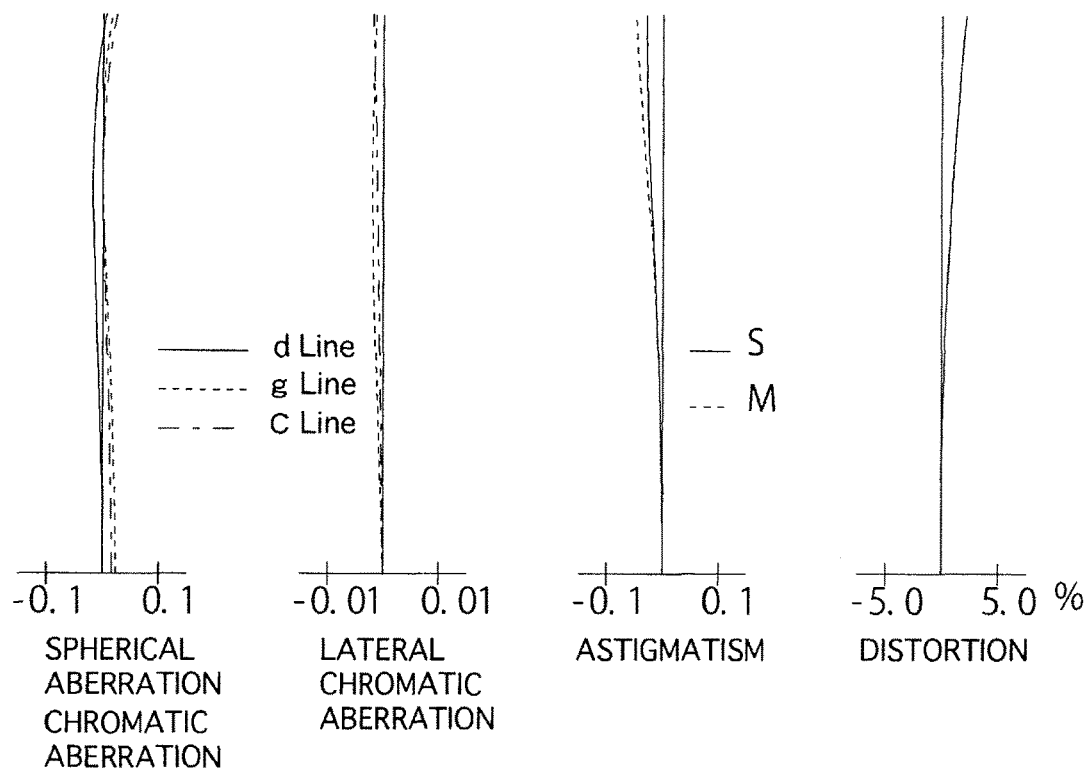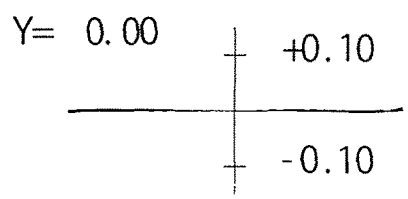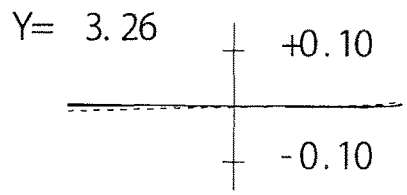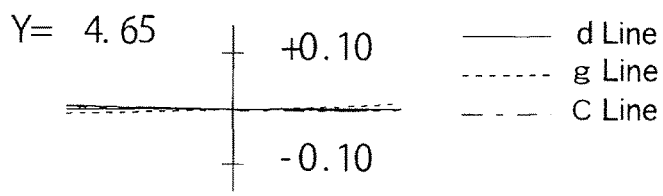

ZOOM LENS SYSTEM AND ELECTRONIC IMAGING APPARATUS USING THE SAME

CROSS REFERENCE TO RELATED APPLICATIONS

This is a divisional application of U.S. patent application Ser. No. 13/777,110, filed Feb. 26, 2016, now U.S. Pat. No. 9,690,083, which claims the benefit of Japanese Patent Application No. 2012-277049, filed on Dec. 19, 2012, and Japanese Application No. 2012-046297, filed Mar. 2, 2012. The entire disclosure of each of the above-identified applications, including the specification, drawings, and claims, is incorporated herein by reference in its entirety.

BACKGROUND OF THE INVENTION

1. Field of the Invention

The present invention relates to a zoom lens system and an electronic imaging apparatus using the zoom lens system.

2. Description of Related Art

In recent years there has been an increasing need for a zoom lens system in an electronic imaging apparatus, such as a digital camera, etc., to be more compact (miniaturized) and to have higher optical performance.

Japanese Unexamined Patent Publication Nos. H06-51202, 2002-162564 and 2009-288619 disclose a zoom lens system configured of a positive first lens group, a negative second lens group, a positive third lens group, and a positive fourth lens group, in that order from the object side.

In each of the zoom lens systems disclosed in these Japanese Unexamined Patent Publications, the number of lens elements to be used for the entire lens system (especially, for the fourth lens group) is too many, and accordingly such zoom lens systems do not sufficiently reduce the weight the zoom lens system. Moreover, the balance of refractive power over the first lens group to the fourth lens group (in particular, the refractive-power balance between the first lens group and the fourth lens group, the refractive-power balance between the second lens group and the third lens group, and the refractive-power balance between the third lens group and the fourth lens group) are not set adequately. Accordingly, aberrations such as field curvature, astigmatism, distortion, spherical aberration and coma, are not sufficiently corrected, which causes deterioration of the optical performance.

SUMMARY OF THE INVENTION

The present invention has been devised with consideration of the above-described problems and provides a zoom lens system which is compact (miniaturized) with smaller number of lens elements thereby achieving light weight, and can favorably correct aberrations, such as field of curvature, astigmatism, distortion, spherical aberration and coma, thereby achieving higher optical performance. The present invention also provides an electronic imaging apparatus which uses such a zoom lens system.

According to an aspect of the present invention, a zoom lens system is provided, including a positive first lens group, a negative second lens group, a positive third lens group, and a positive fourth lens group, in that order from the object side. Upon zooming from the short focal length extremity to the long focal length extremity, at least the second lens group and the third lens group move in the optical axis direction so that the distance between the first lens group and the second lens group increases, and the distance between the second lens group and the third lens group decreases. The fourth lens group includes a positive lens element having a convex surface on the object side, a cemented lens formed from a positive lens element having a convex surface on the object side and a negative lens element having a concave surface on the image side, in that order from the object side, a biconvex positive lens element, and a negative meniscus lens element having a convex surface on the image side, in that order from the object side. The following condition (1) is satisfied:

$$1.6 < f1/f4 < 3.0 \qquad (1),$$

wherein f1 designates the focal length of the first lens group, and f4 designates the focal length of the fourth lens group.

It is desirable for the following condition (2) to be satisfied:

$$-8.0 < f3/f2 < -3.0 \qquad (2),$$

wherein f2 designates the focal length of the second lens group, and f3 designates the focal length of the third lens group.

It is desirable for the following condition (3) to be satisfied:

$$1.4 < f3/f4 < 5.0 \qquad (3),$$

wherein f3 designates the focal length of the third lens group, and f4 designates the focal length of the fourth lens group.

In an embodiment, a zoom lens system is provided, including a positive first lens group, a negative second lens group, a positive third lens group, and a positive fourth lens group, in that order from the object side. Upon zooming from the short focal length extremity to the long focal length extremity, at least the second lens group and the third lens group move in the optical axis direction so that the distance between the first lens group and the second lens group increases, and the distance between the second lens group and the third lens group decreases. The following conditions (1) and (2) are satisfied:

$$1.6 < f1/f4 < 3.0 \qquad (1),$$

and $$-8.0 < f3/f2 < -3.0 \qquad (2),$$

wherein f1 designates the focal length of the first lens group, f2 designates the focal length of the second lens group, f3 designates the focal length of the third lens group, and f4 designates the focal length of the fourth lens group.

It is desirable for the following condition (3) to be satisfied:

$$1.4 < f3/f4 < 5.0 \qquad (3),$$

wherein f3 designates the focal length of the third lens group, and f4 designates the focal length of the fourth lens group.

In an embodiment, a zoom lens system is provided, including a positive first lens group, a negative second lens group, a positive third lens group, and a positive fourth lens group, in that order from the object side. Upon zooming from the short focal length extremity to the long focal length extremity, at least the second lens group and the third lens group move in the optical axis direction so that the distance between the first lens group and the second lens group increases, and the distance between the second lens group and the third lens group decreases. The following conditions (1) and (3) are satisfied:

$$1.6 < f1/f4 < 3.0 \quad (1),$$

and $$1.4 < f3/f4 < 5.0 \quad (3),$$

wherein f1 designates the focal length of the first lens group, f3 designates the focal length of the third lens group, and f4 designates the focal length of the fourth lens group.

It is desirable for the first lens group to include a positive first sub lens group which does not move in the optical axis direction during focusing, and a positive second sub lens group including a focusing lens group which moves in order to perform a focusing operation.

It is desirable for the following condition (4) to be satisfied:

$$-0.7 < f2/f4 < -0.35 \quad (4),$$

wherein f2 designates the focal length of the second lens group, and f4 designates the focal length of the fourth lens group.

It is desirable for the following condition (5) to be satisfied:

$$80 < vd4p \leq 94.96 \quad (5),$$

wherein $v d4p$ designates the Abbe number, with respect to the d-line, of at least one of the positive lens elements in the fourth lens group.

It is desirable for the following condition (6) to be satisfied:

$$1.56 < Nd4p \leq 1.64 \quad (6),$$

wherein Nd4p designates the refractive index of the d-line of the positive lens element, which is provided closest to the object side within the fourth lens group.

It is desirable for the following condition (7) to be satisfied:

$$1.70 < Nd4n \leq 1.80518 \quad (7),$$

wherein Nd4n designates the refractive index of the d-line of the negative meniscus lens element, which is provided closest to the image side within the fourth lens group.

In an embodiment, a zoom lens system is provided, including a positive first lens group, a negative second lens group, a positive third lens group, and a positive fourth lens group, in that order from the object side. Upon zooming from the short focal length extremity to the long focal length extremity, the first lens group does not move along the optical axis direction relative to the imaging plane, and the second lens group and the third lens group are movable in the optical axis direction. The first lens group includes at least one negative lens element. The following condition (8) is satisfied:

$$vd1n < 22.85 \quad (8),$$

wherein $v$ d1n designates the Abbe number, with respect to the d-line, of the negative lens element, which is provided closest to the object side within the first lens group.

It is desirable for the following condition (1) to be satisfied:

$$1.6 < f1/f4 < 3.0 \quad (1),$$

wherein f1 designates the focal length of the first lens group, and f4 designates the focal length of the fourth lens group.

It is desirable for the following condition (2) to be satisfied:

$$-8.0 < f3/f2 < -3.0 \quad (2),$$

wherein f2 designates the focal length of the second lens group, and f3 designates the focal length of the third lens group.

It is desirable for the following condition (3) to be satisfied:

$$1.4 < f3/f4 < 5.0 \quad (3),$$

wherein f3 designates the focal length of the third lens group, and f4 designates the focal length of the fourth lens group.

It is desirable for the following condition (4) to be satisfied:

$$-0.7 < f2/f4 < -0.35 \quad (4),$$

wherein f2 designates the focal length of the second lens group, and f4 designates the focal length of the fourth lens group.

Upon zooming from the short focal length extremity to the long focal length extremity, it is desirable for the first lens group and the fourth lens group not to move relative to the imaging plane.

In an embodiment, an electronic imaging device is provided, including the above-described zoom lens system, and an image sensor that electronically converts images formed through the zoom lens system into electric signals.

According to the present invention, a zoom lens system is achieved, which is compact (miniaturized) with a smaller number of lens elements, thereby achieving light weight and can favorably correct aberrations, such as field of curvature, astigmatism, distortion, spherical aberration and coma, thereby achieving higher optical performance. The present invention also provides an electronic imaging apparatus which uses such a zoom lens system.

The present disclosure relates to subject matters contained in Japanese Patent Application Nos. 2012-46297 (filed on Mar. 2, 2012) and 2012-277049 (filed on Dec. 19, 2012) which are expressly incorporated herein in their entirety.

BRIEF DESCRIPTION OF THE DRAWINGS

The present invention will be discussed below in detail with reference to the accompanying drawings, in which:

FIGS. 2A, 2B, 2C and 2D show various aberrations that occurred in the lens arrangement shown in FIG. 1;

FIGS. 3A, 3B and 3C show lateral aberrations that occurred in the lens arrangement shown in FIG. 1;

FIGS. 5A, 5B, 5C and 5D show various aberrations that occurred in the lens arrangement shown in FIG. 4;

FIGS. 6A, 6B and 6C show lateral aberrations that occurred in the lens arrangement shown in FIG. 4;

FIGS. 11A, 11B, 11C and 11D show various aberrations that occurred in the lens arrangement shown in FIG. 10;

FIGS. 12A, 12B and 12C show lateral aberrations that occurred in the lens arrangement shown in FIG. 10;

FIGS. 14A, 14B, 14C and 14D show various aberrations that occurred in the lens arrangement shown in FIG. 13;

FIGS. 15A, 15B and 15C show lateral aberrations that occurred in the lens arrangement shown in FIG. 13;

FIGS. 17A, 17B, 17C and 17D show various aberrations that occurred in the lens arrangement shown in FIG. 16;

FIGS. 18A, 18B and 18C show lateral aberrations that occurred in the lens arrangement shown in FIG. 16;

FIGS. 20A, 20B, 20O and 20D show various aberrations that occurred in the lens arrangement shown in FIG. 19;

FIGS. 21A, 21B and 21C show lateral aberrations that occurred in the lens arrangement shown in FIG. 19;

FIGS. 23A, 23B, 23C and 23D show various aberrations that occurred in the lens arrangement shown in FIG. 22;

FIGS. 24A, 24B and 24C show lateral aberrations that occurred in the lens arrangement shown in FIG. 22;

FIGS. 26A, 26B, 26C and 26D show various aberrations that occurred in the lens arrangement shown in FIG. 25;

FIGS. 27A, 27B and 27C show lateral aberrations that occurred in the lens arrangement shown in FIG. 25;

FIGS. 29A, 29B, 29C and 29D show various aberrations that occurred in the lens arrangement shown in FIG. 28;

FIGS. 30A, 30B and 30C show lateral aberrations that occurred in the lens arrangement shown in FIG. 28;

FIGS. 32A, 32B, 32C and 32D show various aberrations that occurred in the lens arrangement shown in FIG. 31;

FIGS. 33A, 33B and 33C show lateral aberrations that occurred in the lens arrangement shown in FIG. 31;

FIGS. 38A, 38B, 38C and 38D show various aberrations that occurred in the lens arrangement shown in FIG. 37;

FIGS. 39A, 39B and 39C show lateral aberrations that occurred in the lens arrangement shown in FIG. 37;

DESCRIPTION OF THE EMBODIMENTS

Figure 43:
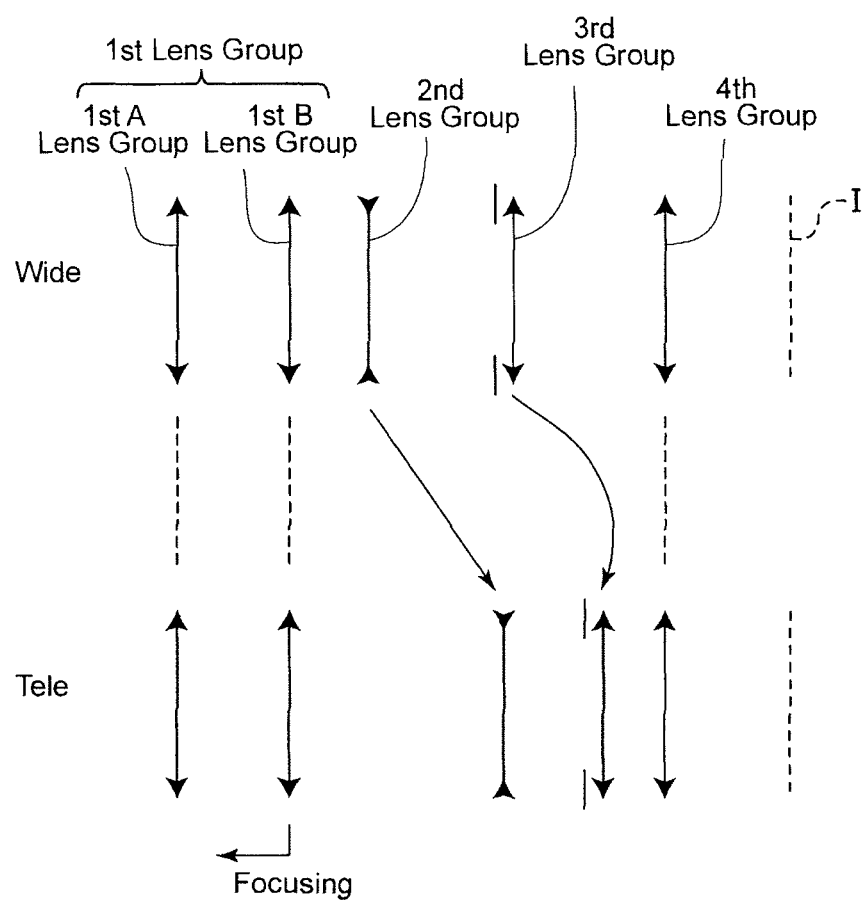
FIG. 43 shows zoom paths of the zoom lens system according to the present invention.

The zoom lens system of the illustrated embodiments, as shown in the zoom paths of FIG. 43, is configured of a positive first lens group G1, a negative second lens group G2, a positive third lens group G3, and a positive fourth lens group G4, in that order from the object side. The first lens group G1 is configured of a positive first sub lens group G1A and a positive second sub lens group G1B, in that order from the object side. A diaphragm S, which is provided between the second lens group G2 and the third lens group G3, moves integrally with the third lens group G3 in the optical axis direction. 'I' designates the imaging plane.

In the zoom lens system of the present invention, upon zooming from the short focal length extremity (W) to the long focal length extremity (T), the distance between the first lens group G1 and the second lens group G2 increases, the distance between the second lens group G2 and the third lens group G3 decreases, and the distance between the third lens group G3 and the fourth lens group G4 decreases, while within the first lens group G1, the distance between the first sub lens group G1A and the second sub lens group G1B does not change.

Specifically, upon zooming from the short focal length extremity (W) to the long focal length extremity (T), the first lens group G1 (the first sub lens group G1A, and the second sub lens group G1B) and the fourth lens group G4 are stationary (do not move in the optical axis direction) with respect to the imaging plane I. On the other hand, an arrangement is possible in which the first lens group G1 (the first sub lens group G1A, the second sub lens group G1B) and the fourth lens group G4 can be movable in the optical axis direction upon zooming from the short focal length extremity (W) to the long focal length extremity (T).

The second lens group G2 moves monotonically toward the image side upon zooming from the short focal length extremity (W) to the long focal length extremity (T).

The third lens group G3, upon zooming from the short focal length extremity (W) to the long focal length extremity (T), moves toward the image side and thereafter slightly moves toward the object side (i.e., the entire third lens group G3 moves toward the image side with respect to the short focal length extremity (W)), or moves monotonically toward the image side.

The first sub lens group G1A is stationary during focusing, and the second sub lens group G1B is a focusing lens group which is arranged to move toward the object side to perform a focusing operation on an object at infinity to an object at close distance.

In each of the first through the seventh numerical embodiments, the first sub lens group G1A of the first lens group G1 is configured of a cemented lens including a negative lens element 11 and a positive lens element 12, in that order from the object side. The negative lens element 11 is made of a high-dispersion glass material whose Abbe number, with respect to the d-line, is 22.8 (for example, OHARA S-NPH1, produced by OHARA INC.).

In each of the first through the seventh numerical embodiments, the second sub lens group G1B is configured of a positive single lens element 13.

In each of the first through the seventh numerical embodiments, the second lens group G2 is configured of a negative lens element 21, a cemented lens including a negative lens element 22 and a positive lens element 23, and a negative lens element 24, in that order from the object side.

In each of the first through the seventh numerical embodiments, the third lens group G3 is configured of a cemented lens including a positive lens element 31 and a negative lens element 32, in that order from the object side.

In each of the first through the seventh numerical embodiments, the fourth lens group G4 is configured of a positive lens element (a positive lens element having a convex surface on the object side) 41, a cemented lens including a positive lens element (a positive lens element having a convex surface on the object side) 42 and a negative lens element (a negative lens element having a concave surface on the image side) 43, a positive lens element (a positive biconvex lens element) 44, and a negative lens element (a meniscus lens element having a convex surface on the image side) 45, in that order from the object side.

In the zoom lens system of the illustrated embodiments, the first lens group G1 and the fourth lens group G4 are stationary with respect to the imaging plane I, upon zooming from the short focal length extremity (W) to the long focal length extremity (T); zooming is mainly performed by the second lens group G2, and the third lens group G3 is arranged to compensate fluctuation of the imaging plane I that occurs during zooming. Furthermore, the first lens group G1 is divided into the first sub lens group G1A and the second sub lens group G1B, in which the first sub lens group G1A is stationary while the second sub lens group G1B functions as a focusing lens group which is movable to perform focusing. Due to this arrangement, the zoom lens system is achieved in which the entire length of the zoom lens system remains unchanged during both zooming and focusing, and the F-number does not fluctuate much.

In the zoom lens system of the illustrated embodiments, the fourth lens group G4 is configured of five lens elements, i.e., a positive lens element 41, a cemented lens including a positive lens element 42 and a negative lens element 43, a positive lens element 44 and a negative lens element 45, in that order from the object side, thereby the number of the lens elements can be reduced, and accordingly, not only the fourth lens group G4 but also the entire zoom lens system can achieve weight reduction.

In the zoom lens system of the illustrated embodiments, the fourth lens group G4 is provided with the majority of image-forming function for zoom lens system. Therefore, the correction of aberrations, such as spherical aberration, coma, field curvature and astigmatism, etc., by the fourth lens group G4 is an important technical issue that needs to be dealt with in order to attain satisfactory optical performance.

Hence, spherical aberration and coma are favorably corrected by providing (in a Gaussian arrangement) the positive lens element (the positive lens element having a convex surface facing toward the object side) 41, the cemented lens including the positive lens element (the positive lens element having a convex surface on the object side) 42 and the negative lens element (the negative lens element having a concave surface on the image side) 43, in that order from the object side, in the front (object-side) portion of the fourth lens group G4.

The rear (image-side) portion of the fourth lens group G4 is provided with the positive lens element (the positive biconvex lens element) 44 and the negative lens element (the meniscus lens element having the convex surface on the image side) 45, in that order from the object side, thereby favorably correcting field curvature and astigmatism.

Furthermore, in the zoom lens system of the illustrated embodiments, since the refractive power is suitably distributed over the first lens group G1 through the fourth lens group G4, aberrations such as field curvature, astigmatism, distortion, spherical aberration, coma, etc., are suitably corrected, and satisfactory optical performance can be attained.

Condition (1) specifies the ratio of the focal length of the first lens group G1 to that of the fourth lens group G4. By satisfying condition (1), the occurrence of spherical aberration, coma and distortion can be reduced.

If the upper limit of condition (1) is exceeded, the refractive power of the fourth lens group G4 becomes too strong, so that spherical aberration and coma in the entire focal length range (the entire zooming range) easily occurs.

If the lower limit of condition (1) is exceeded, the refractive power of the first lens group G1 becomes too strong, so that a large amount of distortion occurs at the long focal length extremity.

Condition (2) specifies the ratio of the focal length of the third lens group G3 to that of the second lens group G2. By satisfying condition (2), fluctuations in field curvature, coma and astigmatism during zooming, can be reduced.

If the upper limit of condition (2) is exceeded, the refractive power of the third lens group G3 becomes too strong, so that fluctuation of coma during zooming increases.

If the lower limit of condition (2) is exceeded, the refractive power of the second lens group G2 becomes too strong, so that fluctuation of field of curvature and astigmatism during zooming increases.

Condition (3) specifies the ratio of the focal length of the third lens group G3 to that of the fourth lens group G4. By satisfying condition (3), the occurrence of spherical aberration and coma can be reduced, and fluctuation of coma upon zooming can be reduced.

If the upper limit of condition (3) is exceeded, the refractive power of the fourth lens group G4 becomes too strong, so that spherical aberration and coma in the entire focal length range (the entire zooming range) easily occurs.

If the lower limit of condition (3) is exceeded, the refractive power of the third lens group G3 becomes too strong, so that fluctuation of coma upon zooming increases.

Condition (4) specifies the ratio of the focal length of the second lens group G2 to the focal length of the fourth lens group G4. By satisfying condition (4), the occurrence of distortion, spherical aberration and coma can be reduced.

If the upper limit of condition (4) is exceeded, the refractive power of the fourth lens group G4 becomes too weak, so that a large amount of distortion occurs at the long focal length extremity.

If the lower limit of condition (4) is exceeded, the refractive power of the fourth lens group G4 becomes too strong, so that spherical aberration and coma easily occurs over the entire focal length range (the entire zooming range).

Condition (5) specifies the Abbe number, with respect to the d-line, of at least one of the positive lens elements (41, 42 and 44) in the fourth lens group G4. By making at least one of the positive lens elements (41, 42 and 44) in the fourth lens group G4 out of a glass material having a low dispersion satisfying condition (5) (e.g., an ED lens), axial chromatic aberration can suitably be corrected.

If the lower limit of condition (5) is exceeded, axial chromatic aberration cannot be favorably corrected.

Condition (6) specifies the refractive index with respect to the d-line of the positive lens element 41, which is provided closest to the object side within the fourth lens group G4. By satisfying condition (6), spherical aberration and coma can be favorably corrected.

If the lower limit of condition (6) is exceeded, spherical aberration and coma cannot be favorably corrected.

Condition (7) specifies the refractive index with respect to the d-line of the negative lens element 45, which is provided closest to image side within the fourth lens group G4. By satisfying condition (7), field of curvature and astigmatism can be favorably corrected.

If the lower limit of condition (7) is exceeded, field of curvature and astigmatism cannot be favorably corrected.

As described above, in each of the first through the seventh numerical embodiments, the first lens group G1 is configured of the cemented lens including the negative lens element 11 and the positive lens element 12 (the first sub lens group G1A), and the positive single lens element 13 (the second sub lens group G1B). In an alternative arrangement, the first lens group G1 can include two or more negative lens elements by further adding a negative lens element(s) to the first lens group G1.

Condition (8) specifies the Abbe number, with respect to the d-line, of the negative lens element 11 which is provided closest to object side in the first lens group G1. By satisfying condition (8), aberrations such as axial chromatic aberration, lateral chromatic aberration, etc., can be favorably corrected, and a superior optical performance can be achieved, especially at the long focal length extremity.

If the upper limit of condition (8) is exceeded, aberrations such as axial chromatic aberration, lateral chromatic aberration, etc., become difficult to correct, especially at the long focal length extremity, and the optical performance deteriorates.

EMBODIMENTS

Specific first through seventh numerical embodiments of the zoom lens system according to the present invention will be herein discussed. In the various aberration diagrams, lateral aberration diagrams and the tables, the d-line, g-line and the C-line show aberrations at their respective wavelengths; S designates the sagittal image, M designates the meridional image, FNO. designates the F-number, f designates the focal length of the entire optical system, W designates the half angle of view (°), Y designates the image height, fB designates the backfocus, L designates the overall length of the lens system, r designates the radius of curvature, d designates the lens thickness or distance between lenses, N(d) designates the refractive index at the d-line, and d designates the Abbe number with respect to the d-line. The unit used for the various lengths is defined in millimeters (mm). No aspherical lens element is not used in each of the first through seventh numerical embodiments.

First Numerical Embodiment

Figure 1:
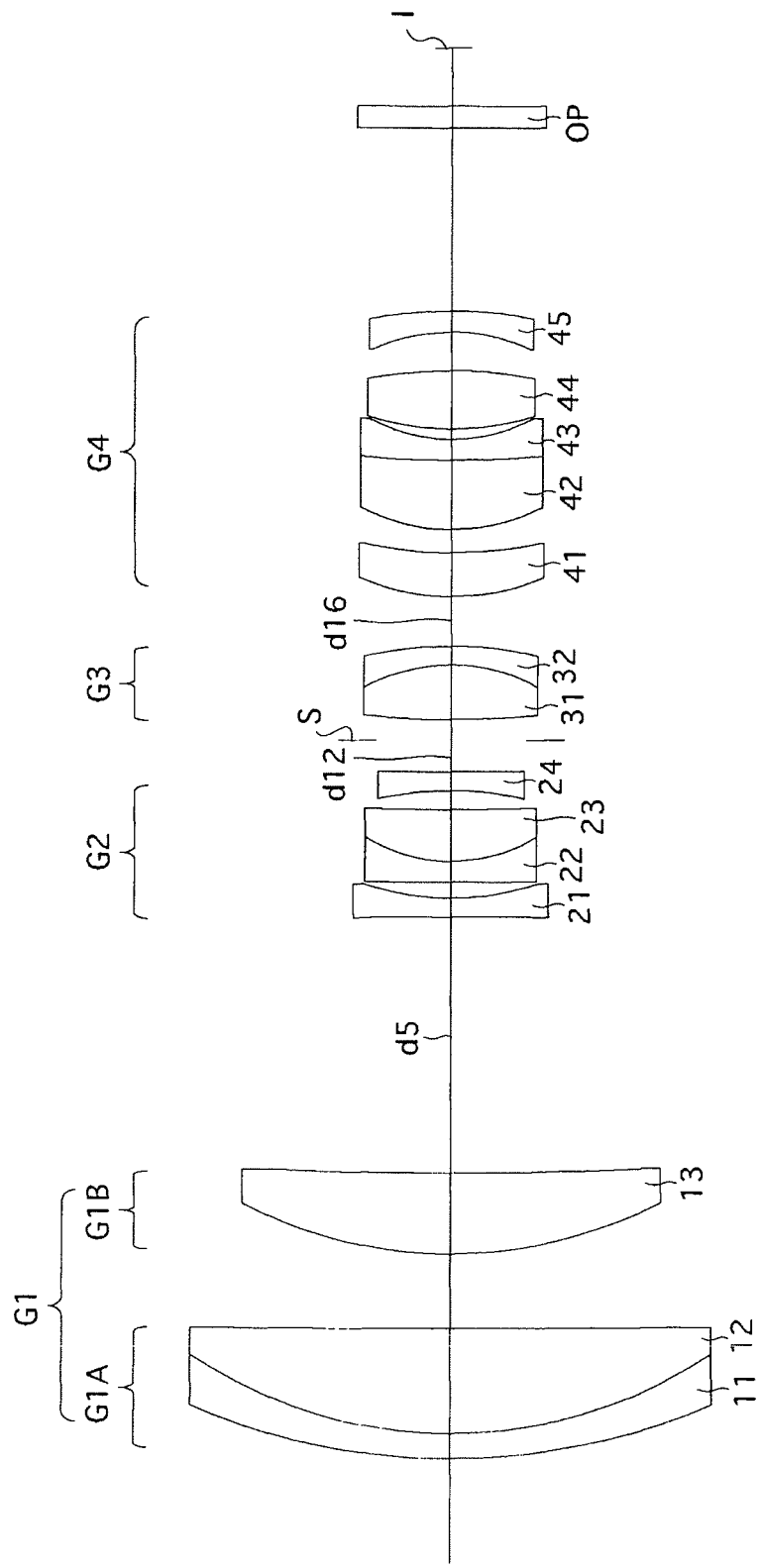
FIG. 1 shows a lens arrangement of a first numerical embodiment of a zoom lens system, according to the present invention, at the long focal length extremity when focused on an object at infinity.
Figure 4:
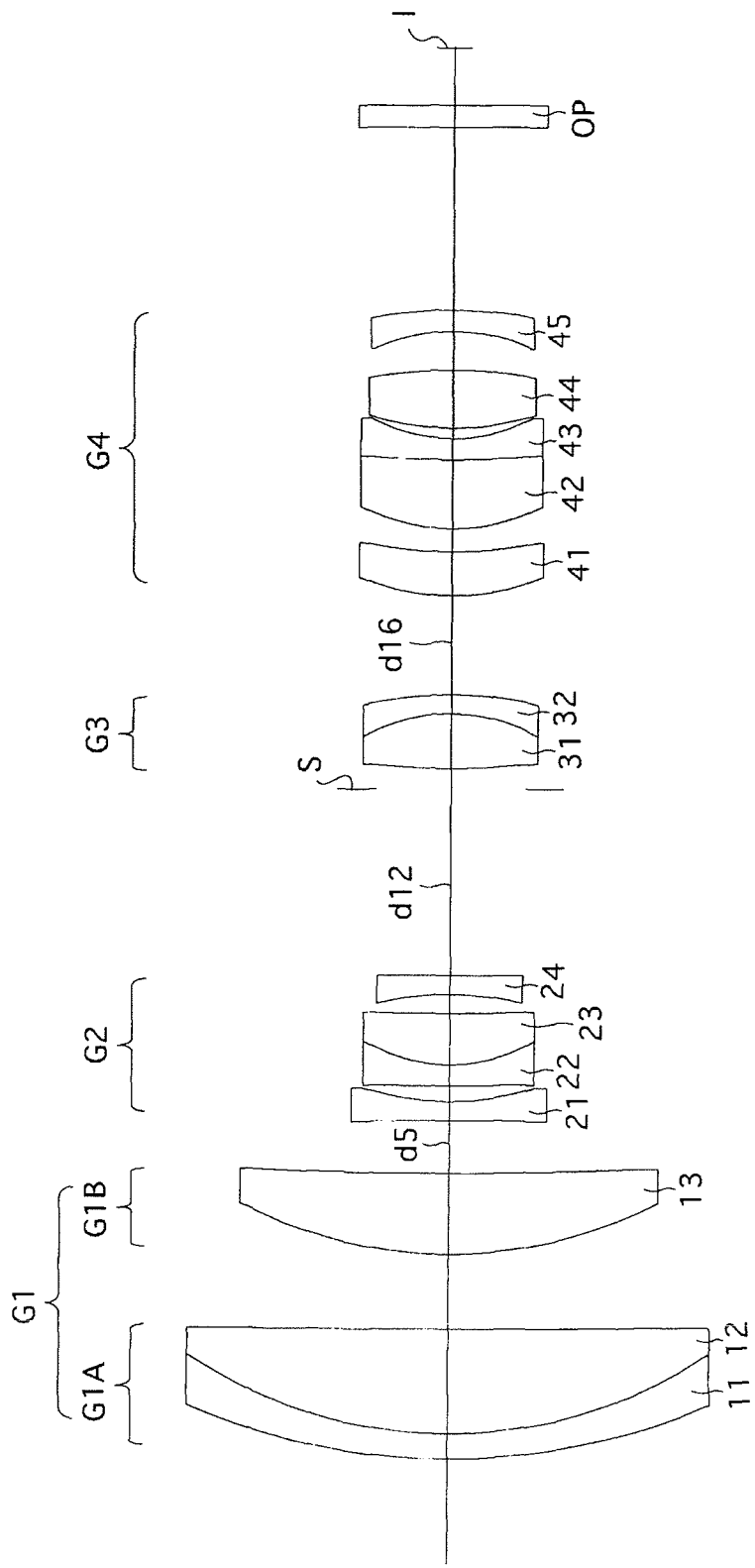
FIG. 4 shows a lens arrangement of the first numerical embodiment of the zoom lens system, according to the present invention, at the short focal length extremity when focused on an object at infinity.

FIGS. 1 through 6C and Tables 1 through 3 show a first numerical embodiment of a zoom lens system according to the present invention. FIG. 1 shows a lens arrangement of the first numerical embodiment of the zoom lens system at the long focal length extremity when focused on an object at infinity. FIGS. 2A, 2B, 2C and 2D show various aberrations that occurred in the lens arrangement shown in FIG. 1. FIGS. 3A, 3B and 3C show lateral aberrations that occurred in the lens arrangement shown in FIG. 1. FIG. 4 shows a lens arrangement of the first numerical embodiment of the zoom lens system at the short focal length extremity when focused on an object at infinity. FIGS. 5A, 5B, 5C and 5D show various aberrations that occurred in the lens arrangement shown in FIG. 4. FIGS. 6A, 6B and 6C show lateral aberrations that occurred in the lens arrangement shown in FIG. 4. Table 1 shows the lens surface data, Table 2 shows various data of the zoom lens system, and Table 3 shows various data of the lens groups according to the first numerical embodiment of the present invention.

The zoom lens system of the present invention is configured of a positive first lens group G1, a negative second lens group G2, a positive third lens group G3 and a positive fourth lens group G4 in that order from the object side. A diaphragm S that is located between the second lens group G2 and the third lens group G3 moves with the third group G3. An optical filter OP is located between the fourth lens group G4 and the image plane I.

The first lens group G1 is configured of a positive first sub lens group G1A and a positive second sub lens group G2A, in that order from the object side. The positive first sub lens group G1A is stationary (does not move) and the positive second sub lens group G1B constitutes a focusing lens group which is arranged to move to perform focusing. The positive second sub lens group G1B moves to the object side when focused on an object at infinity to an object at close distance. The first negative sub lens group G1A is configured of a cemented lens including a negative meniscus lens element 11 having a convex surface on the object side, and a positive meniscus lens element 12 having the convex surface on the object side, in that order from the object side. The negative meniscus lens element 11 is made of a high-dispersion glass material whose Abbe number, with respect to the d-line, is 22.8 (for example, OHARA S-NPH1, made by OHARA INC.).

The second sub lens group G1B includes a single positive meniscus lens element 13 having the convex surface on the object side.

The second lens group G2 is configured of a negative biconcave lens element 21, a cemented lens including a negative meniscus lens element 22 having the convex surface on the object side and a positive meniscus lens element 23 having the convex surface on the object side, and a negative biconcave lens element 24, in that order from the object side.

The third lens group G3 is configured of a cemented lens including a positive biconvex lens element 31 and a negative meniscus lens element 32 having the convex surface on the image side, in that order from the object side.

The fourth lens group G4 is configured of a positive meniscus lens element having the convex surface on the object side (a positive lens element having a convex surface on the object side) 41, a cemented lens including a positive meniscus lens element having the convex surface on the object side (a positive lens element having a convex surface on the object side) 42 and a negative meniscus lens element having the convex surface on the object side (a negative lens element having a concave surface on the image side) 43, a positive biconvex lens element 44 and a negative meniscus lens element 45 having the convex surface on the image side, in that order from the object side.

TABLE 1

SURFACE DATA

| Surf. No. | r | d | N(d) | vd |
|---|---|---|---|---|
| 1 | 31.668 | 1.20 | 1.80810 | 22.8 |
| 2 | 22.349 | 5.00 | 1.49700 | 81.6 |
| 3 | 918.122 | 3.54 | | |
| 4 | 21.783 | 3.85 | 1.49700 | 81.6 |
| 5 | 205.847 | d5 | | |
| 6 | −252.348 | 0.90 | 1.81600 | 46.6 |
| 7 | 13.190 | 0.75 | | |
| 8 | 215.787 | 1.00 | 1.77250 | 49.6 |
| 9 | 7.859 | 2.45 | 1.84666 | 23.8 |
| 10 | 119.798 | 0.90 | | |
| 11 | −15.177 | 0.90 | 1.81600 | 46.6 |
| 12 | 268.441 | d12 | | |
| 13 diaphragm | ∞ | 1.00 | | |
| 14 | 41.749 | 2.60 | 1.62041 | 60.3 |
| 15 | −8.616 | 0.90 | 1.85026 | 32.3 |
| 16 | −18.303 | d16 | | |
| 17 | 11.173 | 2.10 | 1.61800 | 63.4 |
| 18 | 20.035 | 1.10 | | |
| 19 | 9.392 | 3.30 | 1.43875 | 95.0 |
| 20 | 49.987 | 1.00 | 1.80100 | 35.0 |
| 21 | 8.185 | 0.50 | | |
| 22 | 13.280 | 2.75 | 1.83400 | 37.2 |
| 23 | −22.894 | 1.85 | | |
| 24 | −9.118 | 1.00 | 1.74077 | 27.8 |
| 25 | −21.410 | 8.65 | | |
| 26 | ∞ | 1.00 | 1.51633 | 64.1 |
| 27 | ∞ | — | | |

TABLE 2

ZOOM LENS SYSTEM DATA
Zoom Ratio: 2.85

| | Short Focal Length Extremity | Intermediate Focal Length | Long Focal Length Extremity |
|---|---|---|---|
| FNO. | 2.8 | 2.9 | 2.9 |
| f | 15.45 | 26.00 | 44.10 |
| W | 17.5 | 10.2 | 5.9 |
| Y | 4.65 | 4.65 | 4.65 |
| fB | 2.71 | 2.71 | 2.71 |
| L | 67.00 | 67.00 | 67.00 |
| d5 | 2.50 | 8.47 | 12.21 |
| d12 | 8.85 | 6.23 | 1.48 |
| d16 | 4.70 | 1.35 | 2.36 |

TABLE 3

LENS GROUP DATA

| Lens Group | 1st Surf. | Focal Length |
|---|---|---|
| 1 | 1 | 33.39 |
| 2 | 6 | −7.81 |
| 3 | 14 | 29.05 |
| 4 | 17 | 20.61 |

Second Numerical Embodiment

Figure 7:
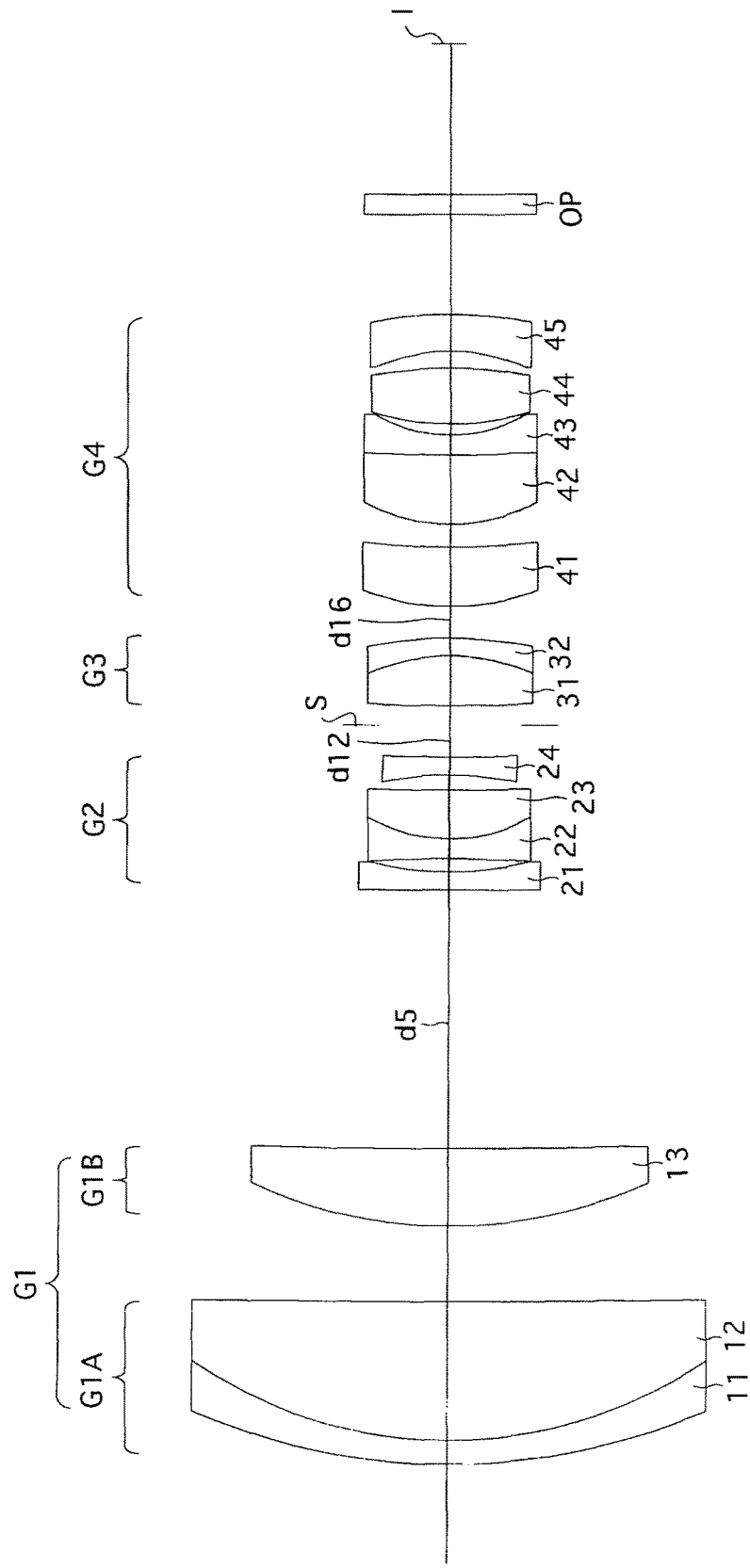
FIG. 7 shows a lens arrangement of a second numerical embodiment of a zoom lens system, according to the present invention, at the long focal length extremity when focused on an object at infinity.
Figure 8A:
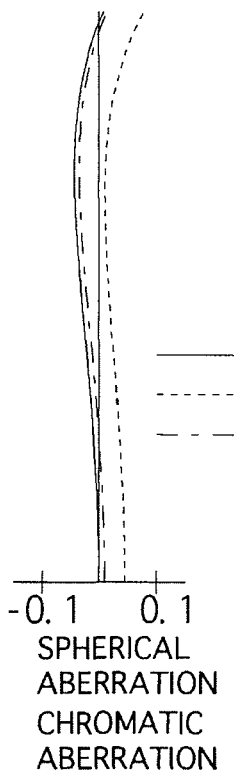
FIGS. 8A, 8B, 8C and 8D show various aberrations that occurred in the lens arrangement shown in FIG. 7.
Figure 8B:
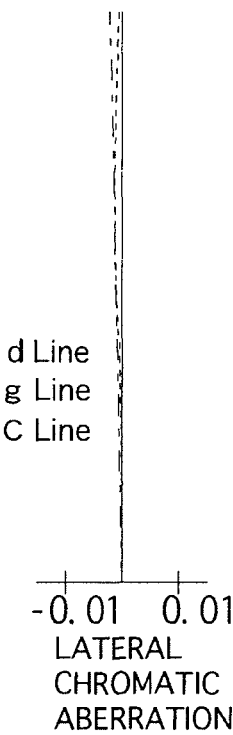
Figure 8C:
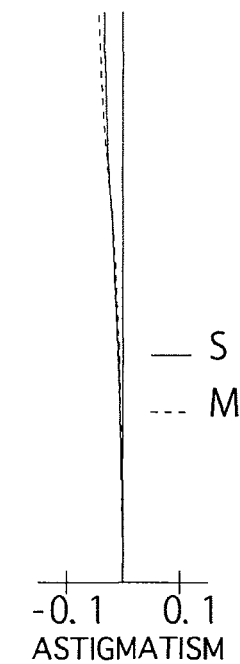
Figure 8D:
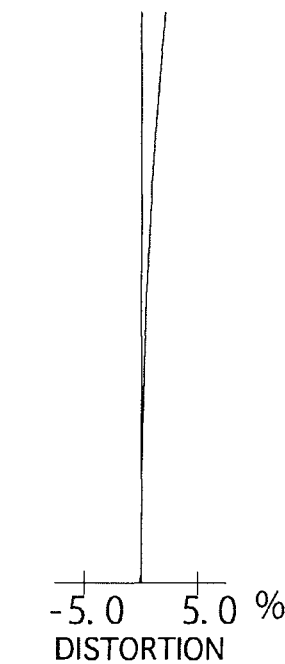
Figure 9A:
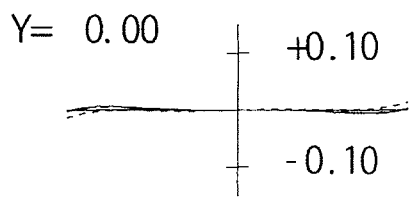
FIGS. 9A, 9B and 9C show lateral aberrations that occurred in the lens arrangement shown in FIG. 7.
Figure 9B:
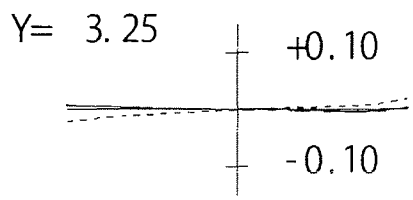
Figure 9C:
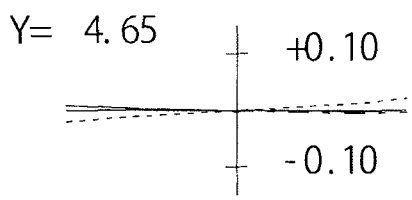
Figure 10:
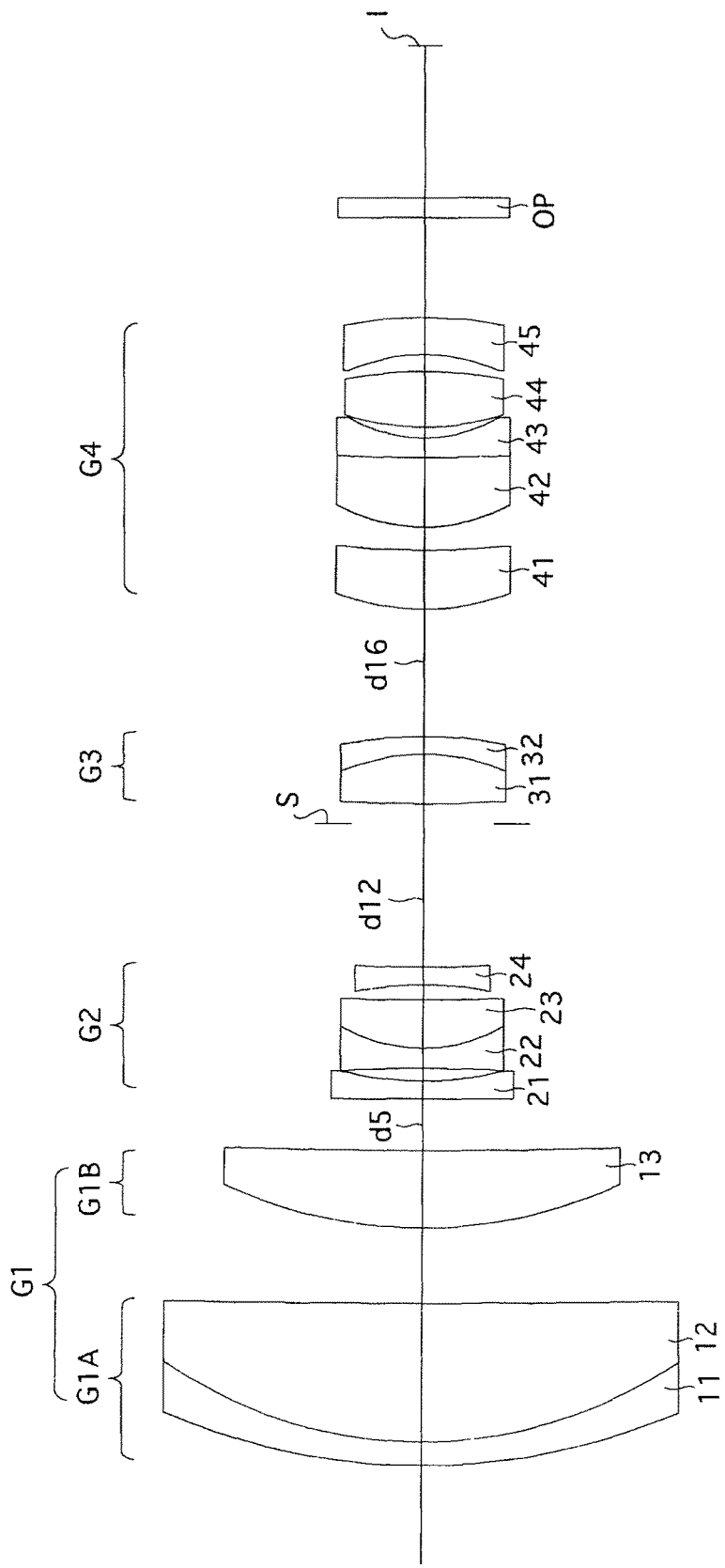
FIG. 10 shows a lens arrangement of the second numerical embodiment of the zoom lens system, according to the present invention, at the short focal length extremity when focused on an object at infinity.

FIGS. 7 through 12C and Tables 4 through 6 show a second numerical embodiment of a zoom lens system according to the present invention. FIG. 7 shows a lens arrangement of the second numerical embodiment of the zoom lens system at the long focal length extremity when focused on an object at infinity. FIGS. 8A, 8B, 8C and 8D show various aberrations that occurred in the lens arrangement shown in FIG. 7. FIGS. 9A, 9B and 9C show lateral aberrations that occurred in the lens arrangement shown in FIG. 7. FIG. 10 shows a lens arrangement of the second numerical embodiment of the zoom lens system at the short focal length extremity when focused on an object at infinity. FIGS. 11A, 11B, 11C and 11D show various aberrations that occurred in the lens arrangement shown in FIG. 10. FIGS. 12A, 12B and 12C show lateral aberrations that occurred in the lens arrangement shown in FIG. 10. Table 4 shows the lens surface data, Table 5 shows various data of the zoom lens system, and Table 6 shows various data of the lens groups according to the second numerical embodiment of the present invention.

The lens arrangement of the second numerical embodiment is the same as that of the first numerical embodiment except for the following points.

(1) The negative lens element 21 of the second lens group G2 is configured of a negative planoconcave lens element having a concave surface on the image side; and (2) The negative lens element 22 of the second lens group G2 is configured of a negative biconcave lens element.

TABLE 4

SURFACE DATA

| Surf. No. | r | d | N(d) | vd |
|---|---|---|---|---|
| 1 | 32.710 | 1.20 | 1.80810 | 22.8 |
| 2 | 22.977 | 7.00 | 1.49700 | 81.6 |
| 3 | 642.613 | 3.78 | | |
| 4 | 24.052 | 3.90 | 1.49700 | 81.6 |
| 5 | 343.630 | d5 | | |
| 6 | ∞ | 0.90 | 1.81600 | 46.6 |
| 7 | 16.669 | 0.65 | | |
| 8 | −76.672 | 1.00 | 1.77250 | 49.6 |
| 9 | 8.141 | 2.45 | 1.84666 | 23.8 |
| 10 | 151.581 | 0.75 | | |
| 11 | −17.229 | 0.90 | 1.81600 | 46.6 |
| 12 | 64.233 | d12 | | |
| 13 diaphragm | ∞ | 1.00 | | |
| 14 | 79.730 | 2.50 | 1.63854 | 55.4 |
| 15 | −10.326 | 0.90 | 1.91082 | 35.2 |
| 16 | −20.877 | d16 | | |
| 17 | 12.140 | 3.00 | 1.61800 | 63.4 |
| 18 | 39.593 | 1.15 | | |
| 19 | 9.082 | 3.50 | 1.49700 | 81.6 |
| 20 | 90.187 | 1.00 | 1.80100 | 35.0 |
| 21 | 7.652 | 0.55 | | |
| 22 | 13.401 | 2.80 | 1.83481 | 42.7 |
| 23 | −21.300 | 0.85 | | |
| 24 | −9.404 | 1.85 | 1.74077 | 27.8 |

TABLE 4-continued

SURFACE DATA

| Surf. No. | r | d | N(d) | vd |
|---|---|---|---|---|
| 25 | −21.160 | 5.00 | | |
| 26 | ∞ | 1.00 | 1.51633 | 64.1 |
| 27 | ∞ | — | | |

TABLE 5

ZOOM LENS SYSTEM DATA
Zoom Ratio: 2.84

| | Short Focal Length Extremity | Intermediate Focal Length | Long Focal Length Extremity |
|---|---|---|---|
| FNO. | 2.9 | 2.9 | 2.9 |
| f | 15.45 | 26.00 | 43.85 |
| W | 17.6 | 10.2 | 5.9 |
| Y | 4.65 | 4.65 | 4.65 |
| fB | 7.51 | 7.51 | 7.51 |
| L | 71.35 | 71.35 | 71.35 |
| d5 | 2.60 | 8.84 | 13.04 |
| d12 | 7.23 | 5.69 | 1.60 |
| d16 | 6.38 | 1.68 | 1.58 |

TABLE 6

LENS GROUP DATA

| Lens Group | 1st Surf. | Focal Length |
|---|---|---|
| 1 | 1 | 35.86 |
| 2 | 6 | −7.87 |
| 3 | 14 | 39.33 |
| 4 | 17 | 17.17 |

Third Numerical Embodiment

Figure 13:
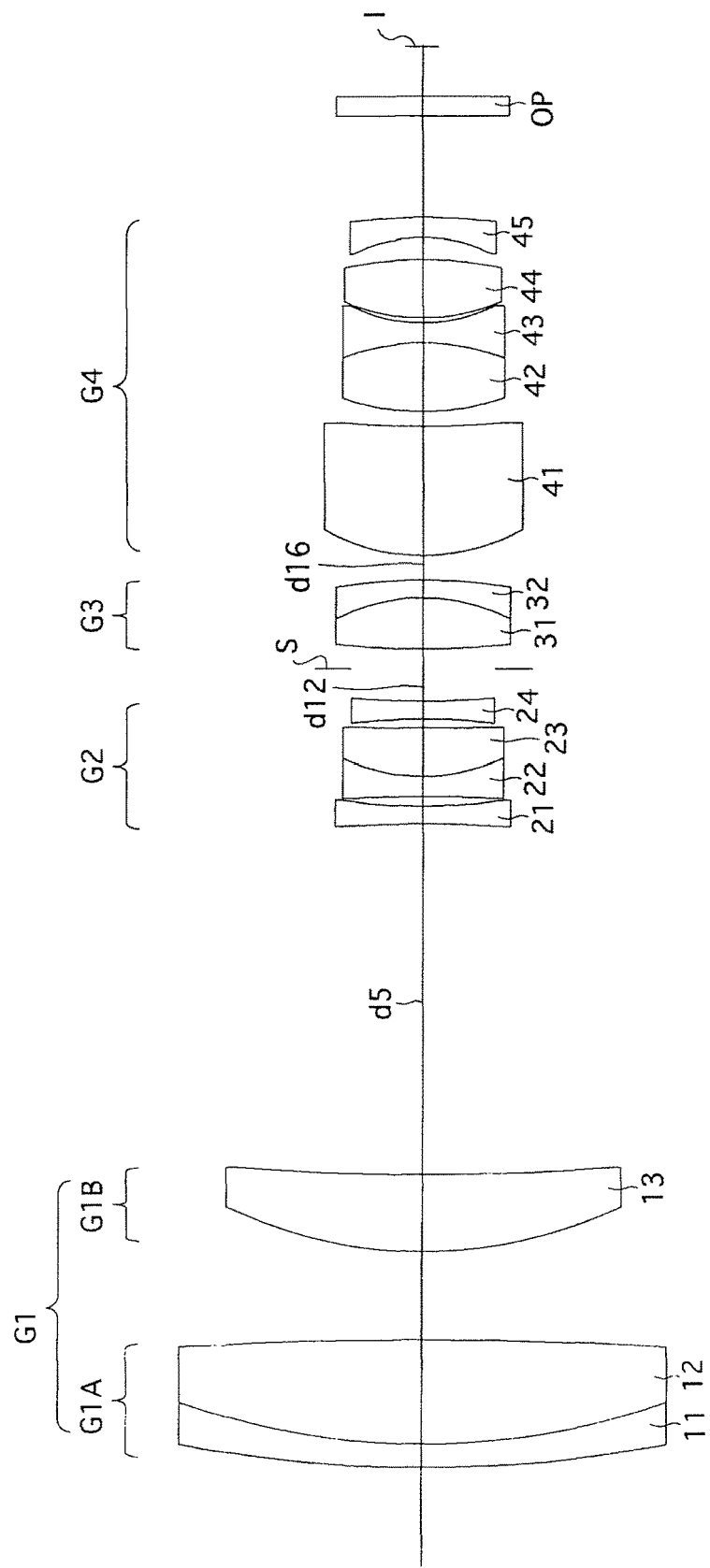
FIG. 13 shows a lens arrangement of a third numerical embodiment of a zoom lens system, according to the present invention, at the long focal length extremity when focused on an object at infinity.
Figure 16:
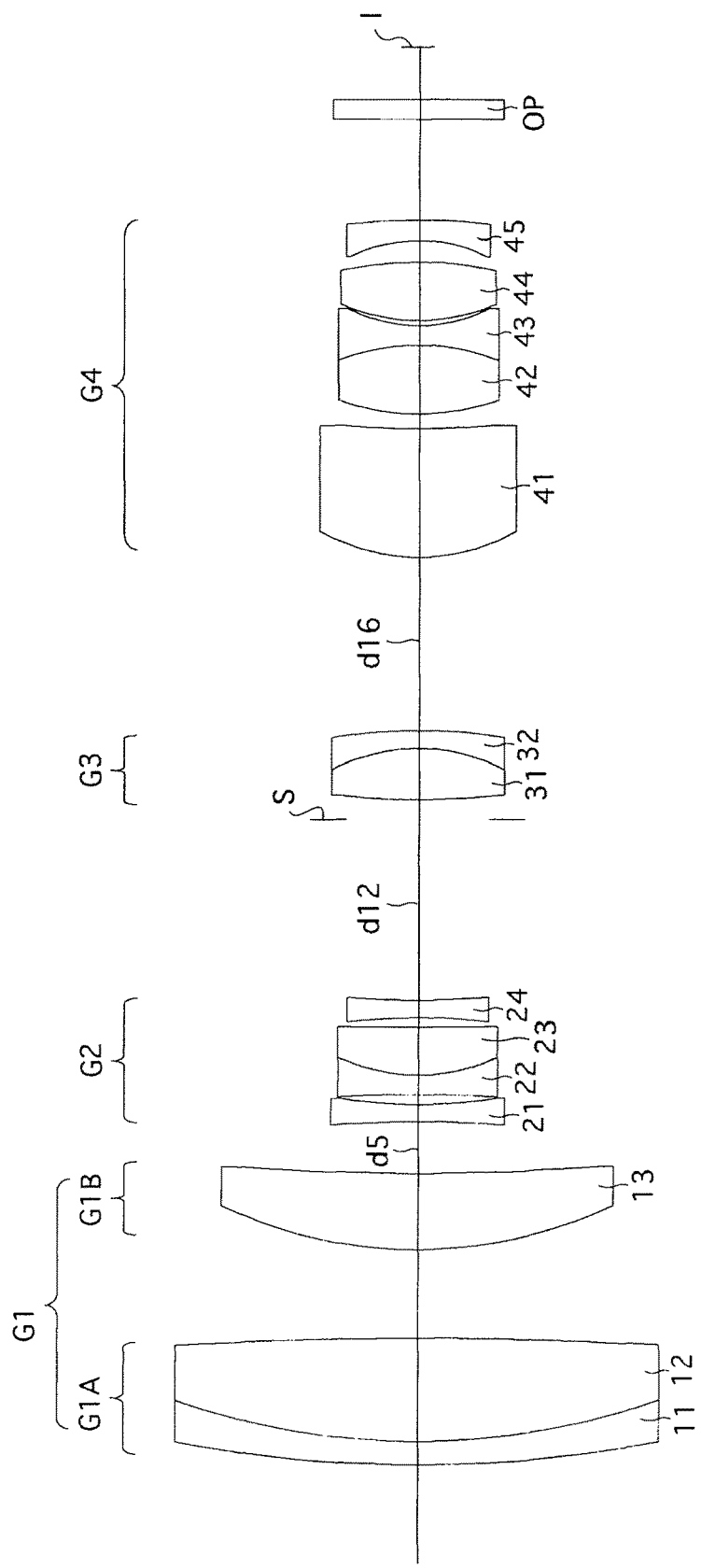
FIG. 16 shows a lens arrangement of the third numerical embodiment of the zoom lens system, according to the present invention, at the short focal length extremity when focused on an object at infinity.

FIGS. 13 through 18C and Tables 7 through 9 show a third numerical embodiment of a zoom lens system according to the present invention. FIG. 13 shows a lens arrangement of the third numerical embodiment of the zoom lens system at the long focal length extremity when focused on an object at infinity. FIGS. 14A, 14B, 14C and 14D show various aberrations that occurred in the lens arrangement shown in FIG. 13. FIGS. 15A, 15B and 15C show lateral aberrations that occurred in the lens arrangement shown in FIG. 13. FIG. 16 shows a lens arrangement of the third numerical embodiment of the zoom lens system at the short focal length extremity when focused on an object at infinity. FIGS. 17A, 17B, 170 and 17D show various aberrations that occurred in the lens arrangement shown in FIG. 16. FIGS. 18A, 18B and 18C show lateral aberrations that occurred in the lens arrangement shown in FIG. 16. Table 7 shows the lens surface data, Table 8 shows various data of the zoom lens system, and Table 9 shows various data of the lens groups according to the third numerical embodiment of the present invention.

The lens arrangement of the third numerical embodiment is the same as that of the first numerical embodiment except for the following points:

(1) The positive lens element 12 of the first lens group G1 (the first sub lens group G1A) is configured of a positive biconvex lens element;

(2) The negative lens element 22 of the second lens group G2 is configured of a negative biconcave lens element;

(3) The positive lens element 42 of the fourth lens group G4 is configured of a positive biconvex lens element; and (4) The negative lens element 43 of the fourth lens group G4 is configured of a negative biconcave lens element.

TABLE 7

SURFACE DATA

| Surf. No. | r | d | N(d) | vd |
|---|---|---|---|---|
| 1 | 66.033 | 1.20 | 1.80810 | 22.8 |
| 2 | 37.629 | 5.30 | 1.49700 | 81.6 |
| 3 | −206.928 | 4.45 | | |
| 4 | 23.718 | 3.90 | 1.49700 | 81.6 |
| 5 | 128.916 | d5 | | |
| 6 | −72.179 | 0.90 | 1.81600 | 46.6 |
| 7 | 26.493 | 0.50 | | |
| 8 | −77.883 | 1.00 | 1.77250 | 49.6 |
| 9 | 9.781 | 2.45 | 1.84666 | 23.8 |
| 10 | 568.348 | 0.45 | | |
| 11 | −31.220 | 0.90 | 1.81600 | 46.6 |
| 12 | 43.320 | d12 | | |
| 13 diaphragm | ∞ | 1.00 | | |
| 14 | 39.879 | 2.60 | 1.69680 | 55.5 |
| 15 | −9.873 | 0.90 | 1.85026 | 32.3 |
| 16 | −27.913 | d16 | | |
| 17 | 10.168 | 6.55 | 1.62041 | 60.3 |
| 18 | 46.935 | 0.75 | | |
| 19 | 12.674 | 3.50 | 1.49700 | 81.6 |
| 20 | −11.279 | 1.00 | 1.83400 | 37.2 |
| 21 | 8.211 | 0.25 | | |
| 22 | 10.030 | 2.95 | 1.83481 | 42.7 |
| 23 | −19.100 | 1.10 | | |
| 24 | −8.053 | 1.00 | 1.77250 | 49.6 |
| 25 | −31.460 | 5.08 | | |
| 26 | ∞ | 1.00 | 1.51633 | 64.1 |
| 27 | ∞ | — | | |

TABLE 8

ZOOM LENS SYSTEM DATA
Zoom Ratio: 2.83

| | Short Focal Length Extremity | Intermediate Focal Length | Long Focal Length Extremity |
|---|---|---|---|
| FNO. | 2.9 | 3.0 | 3.0 |
| f | 15.45 | 26.00 | 43.70 |
| W | 17.5 | 10.2 | 6.0 |
| Y | 4.65 | 4.65 | 4.65 |
| fB | 2.58 | 2.58 | 2.58 |
| L | 71.98 | 71.98 | 71.98 |
| d5 | 2.60 | 11.94 | 17.78 |
| d12 | 9.21 | 6.48 | 1.64 |
| d16 | 8.85 | 2.25 | 1.25 |

TABLE 9

LENS GROUP DATA

| Lens Group | 1st Surf. | Focal Length |
|---|---|---|
| 1 | 1 | 43.71 |
| 2 | 6 | −10.21 |
| 3 | 14 | 31.29 |
| 4 | 17 | 20.95 |

Fourth Numerical Embodiment

Figure 19:
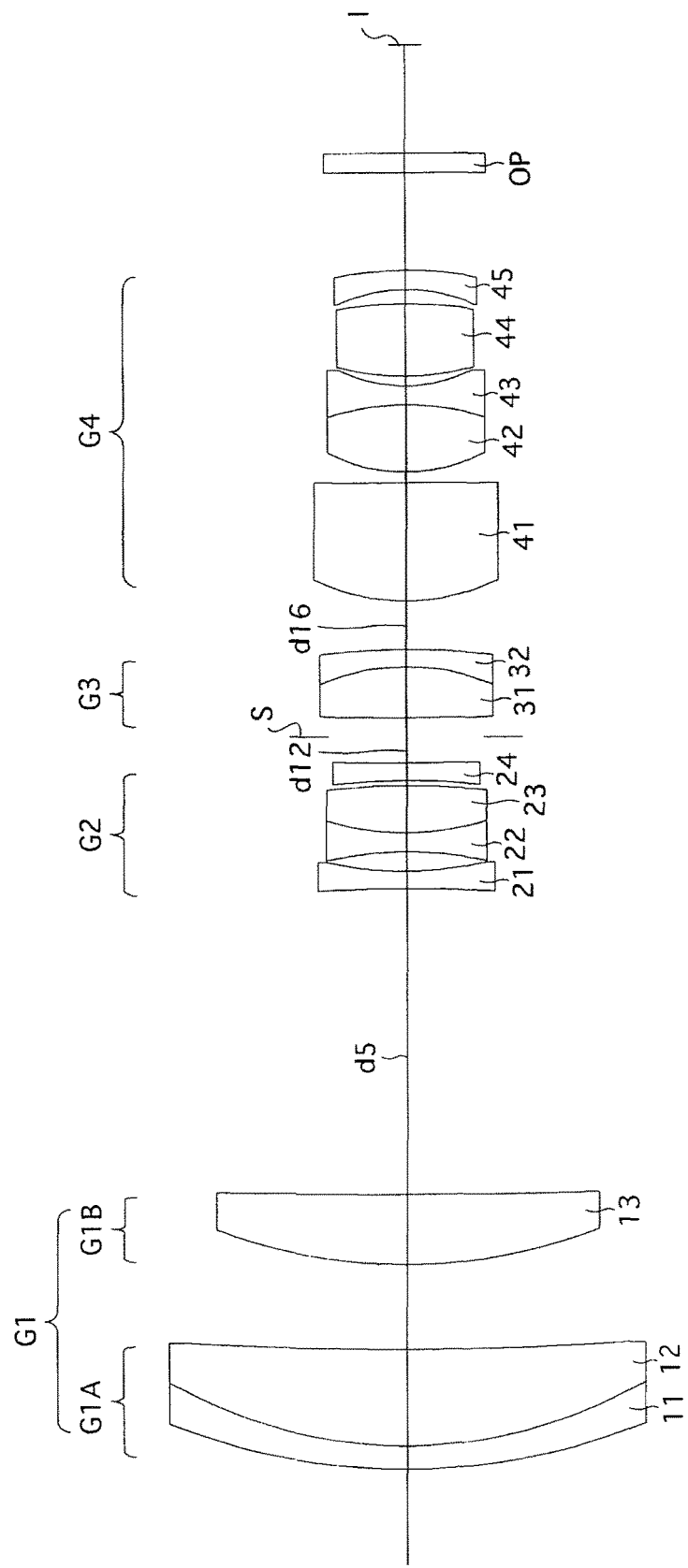
FIG. 19 shows a lens arrangement of a fourth numerical embodiment of a zoom lens system, according to the present invention, at the long focal length extremity when focused on an object at infinity.
Figure 22:
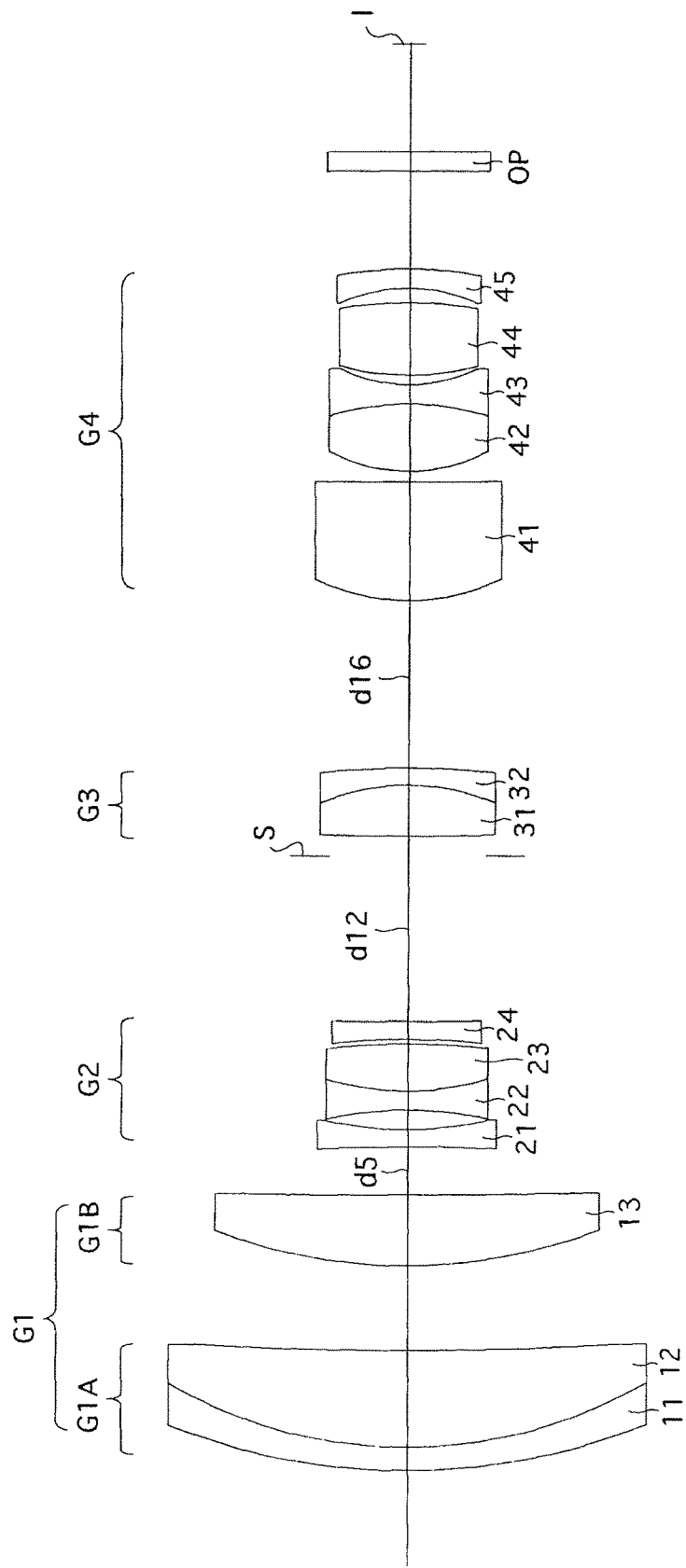
FIG. 22 shows a lens arrangement of the fourth numerical embodiment of the zoom lens system, according to the present invention, at the short focal length extremity when focused on an object at infinity.

FIGS. 19 through 24C and Tables 10 through 12 show a fourth numerical embodiment of a zoom lens system according to the present invention. FIG. 19 shows a lens arrangement of the fourth numerical embodiment of the zoom lens system at the long focal length extremity when focused on an object at infinity. FIGS. 20A, 20B, 20C and 20D show various aberrations that occurred in the lens arrangement shown in FIG. 19. FIGS. 21A, 21B and 21C show lateral aberrations that occurred in the lens arrangement shown in FIG. 19. FIG. 22 shows a lens arrangement of the fourth numerical embodiment of the zoom lens system at the short focal length extremity when focused on an object at infinity. FIGS. 23A, 23B, 23C and 23D show various aberrations that occurred in the lens arrangement shown in FIG. 22. FIGS. 24A, 24B and 24C show lateral aberrations that occurred in the lens arrangement shown in FIG. 22. Table 10 shows the lens surface data, Table 11 shows various data of the zoom lens system, and Table 12 shows various data of the lens groups according to the fourth numerical embodiment of the present invention.

The lens arrangement of the fourth numerical embodiment is the same as that of the first numerical embodiment except for the following points:

(1) The negative lens element 22 of the second lens group G2 is configured of a negative biconcave lens element;

(2) The positive lens element 23 of the second lens group G2 is configured of a positive biconvex lens element;

(3) The positive lens element 42 of the fourth lens group G4 is configured of a positive biconvex lens element; and (4) The negative lens element 43 of the fourth lens group G4 is configured of a negative biconcave lens element.

TABLE 10

SURFACE DATA

| Surf. No. | r | d | N(d) | vd |
|---|---|---|---|---|
| 1 | 33.720 | 1.20 | 1.80810 | 22.8 |
| 2 | 24.725 | 5.05 | 1.49700 | 81.6 |
| 3 | 179.826 | 4.39 | | |
| 4 | 28.313 | 3.65 | 1.49700 | 81.6 |
| 5 | 444.801 | d5 | | |
| 6 | −98.737 | 0.90 | 1.81600 | 46.6 |
| 7 | 18.393 | 1.00 | | |
| 8 | −20.217 | 1.00 | 1.77250 | 49.6 |
| 9 | 13.949 | 2.45 | 1.84666 | 23.8 |
| 10 | −39.218 | 0.25 | | |
| 11 | −37.210 | 0.90 | 1.81600 | 46.6 |
| 12 | 181.034 | d12 | | |
| 13 diaphragm | ∞ | 1.00 | | |
| 14 | 146.637 | 2.65 | 1.72916 | 54.7 |
| 15 | −11.736 | 0.90 | 1.90366 | 31.3 |
| 16 | −38.854 | d16 | | |
| 17 | 10.930 | 6.15 | 1.64000 | 60.1 |
| 18 | 1982.179 | 0.55 | | |
| 19 | 8.701 | 3.50 | 1.43875 | 95.0 |
| 20 | −14.272 | 1.00 | 1.79952 | 42.2 |
| 21 | 7.865 | 0.50 | | |
| 22 | 13.856 | 3.75 | 1.81600 | 46.6 |
| 23 | −23.057 | 0.75 | | |
| 24 | −8.568 | 1.00 | 1.72916 | 54.7 |
| 25 | −19.384 | 5.00 | | |
| 26 | ∞ | 1.00 | 1.51633 | 64.1 |
| 27 | ∞ | — | | |

TABLE 11

ZOOM LENS SYSTEM DATA
Zoom Ratio: 2.87

| | Short Focal Length Extremity | Intermediate Focal Length | Long Focal Length Extremity |
|---|---|---|---|
| FNO. | 2.9 | 2.9 | 2.9 |
| f | 15.45 | 26.00 | 44.30 |
| W | 17.6 | 10.2 | 5.9 |

TABLE 11-continued

ZOOM LENS SYSTEM DATA
Zoom Ratio: 2.87

| | Short Focal Length Extremity | Intermediate Focal Length | Long Focal Length Extremity |
|---|---|---|---|
| Y | 4.65 | 4.65 | 4.65 |
| fB | 5.64 | 5.64 | 5.64 |
| L | 73.98 | 73.98 | 73.98 |
| d5 | 2.50 | 10.38 | 15.92 |
| d12 | 8.62 | 7.76 | 1.37 |
| d16 | 8.69 | 1.66 | 2.52 |

TABLE 12

LENS GROUP DATA

| Lens Group | 1st Surf. | Focal Length |
|---|---|---|
| 1 | 1 | 41.80 |
| 2 | 6 | −10.66 |
| 3 | 14 | 74.60 |
| 4 | 17 | 16.79 |

Fifth Numerical Embodiment

Figure 25:
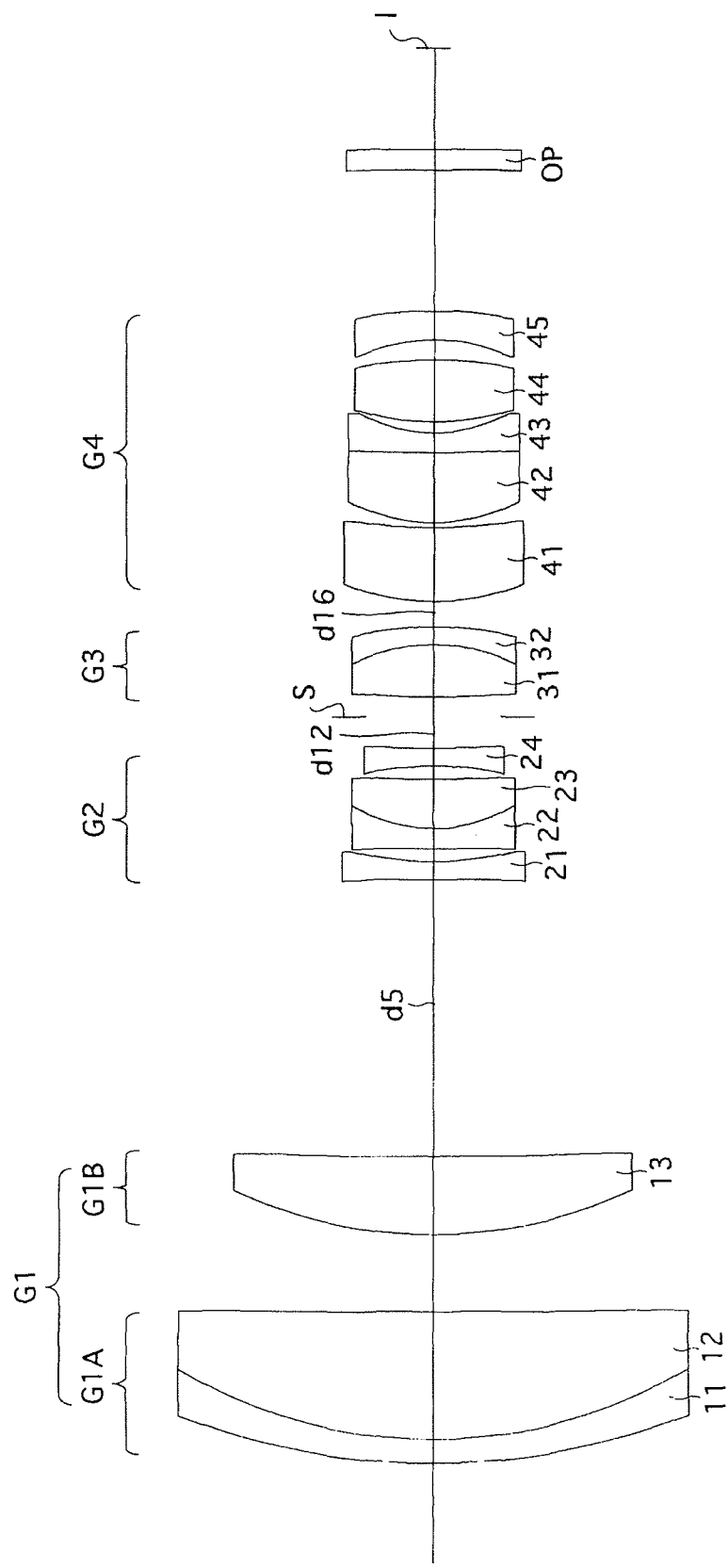
FIG. 25 shows a lens arrangement of a fifth numerical embodiment of a zoom lens system, according to the present invention, at the long focal length extremity when focused on an object at infinity.
Figure 28:
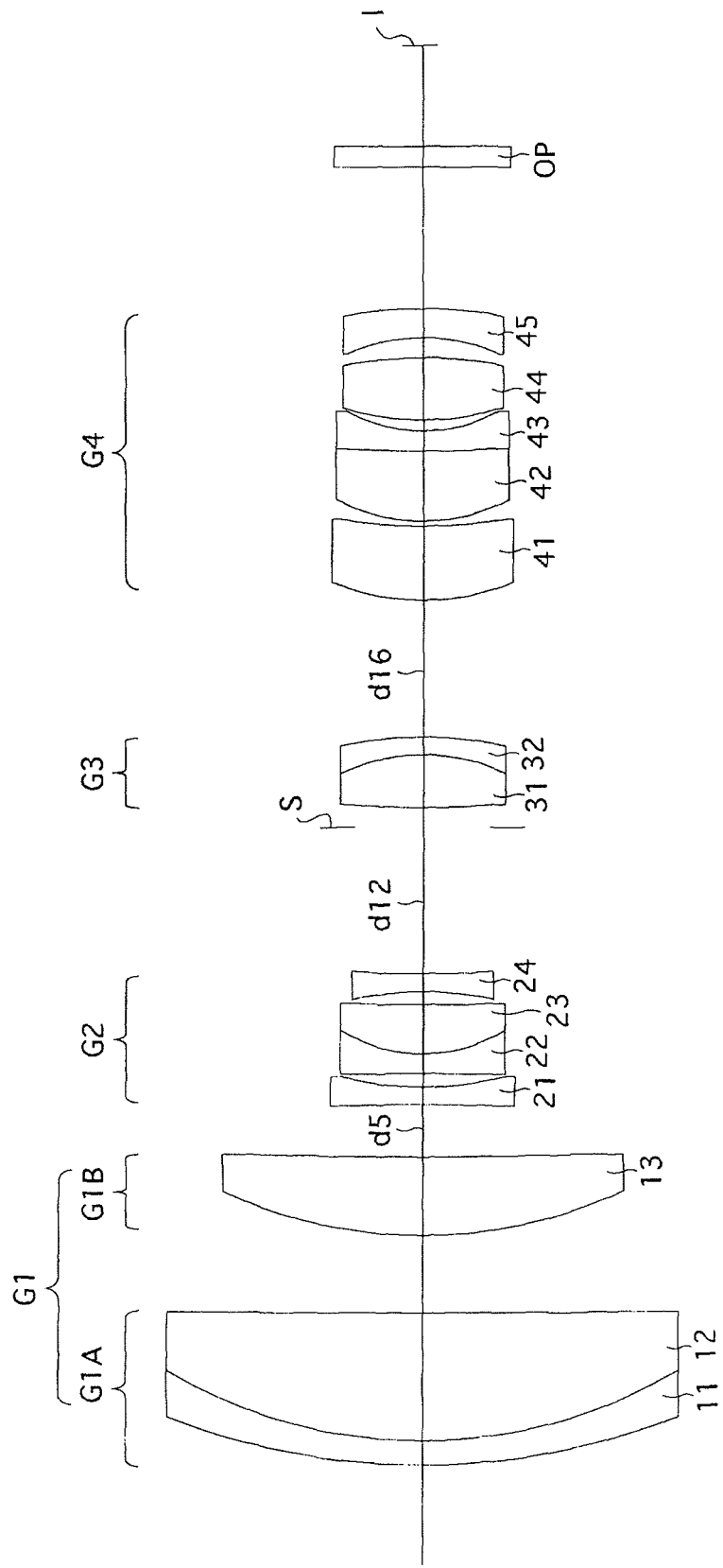
FIG. 28 shows a lens arrangement of the fifth numerical embodiment of the zoom lens system, according to the present invention, at the short focal length extremity when focused on an object at infinity.

FIGS. 25 through 30C and Tables 13 through 15 show a fifth numerical embodiment of a zoom lens system according to the present invention. FIG. 25 shows a lens arrangement of the fifth numerical embodiment of the zoom lens system at the long focal length extremity when focused on an object at infinity. FIGS. 26A, 26B, 26C and 26D show various aberrations that occurred in the lens arrangement shown in FIG. 25. FIGS. 27A, 27B and 27C show lateral aberrations that occurred in the lens arrangement shown in FIG. 25. FIG. 28 shows a lens arrangement of the fifth numerical embodiment of the zoom lens system at the short focal length extremity when focused on an object at infinity. FIGS. 29A, 29B, 29C and 29D show various aberrations that occurred in the lens arrangement shown in FIG. 28. FIGS. 30A, 30B and 30C show lateral aberrations that occurred in the lens arrangement shown in FIG. 28. Table 13 shows the lens surface data, Table 14 shows various data of the zoom lens system, and Table 15 shows various data of the lens groups according to the fifth numerical embodiment of the present invention.

The lens arrangement of the fifth numerical embodiment is the same as that of the first numerical embodiment except for the following point:

(1) The negative lens element 22 of the second lens group G2 is configured of a negative biconcave lens element.

TABLE 13

SURFACE DATA

| Surf. No. | r | d | N(d) | vd |
|---|---|---|---|---|
| 1 | 35.338 | 1.20 | 1.80810 | 22.8 |
| 2 | 24.990 | 6.40 | 1.49700 | 81.6 |
| 3 | 690.628 | 3.85 | | |
| 4 | 23.872 | 3.90 | 1.49700 | 81.6 |
| 5 | 262.419 | d5 | | |
| 6 | −238.384 | 0.90 | 1.81600 | 46.6 |
| 7 | 16.865 | 0.65 | | |
| 8 | −398.851 | 1.00 | 1.77250 | 49.6 |
| 9 | 7.670 | 2.45 | 1.84666 | 23.8 |
| 10 | 93.036 | 0.65 | | |

TABLE 13-continued

SURFACE DATA

| Surf. No. | r | d | N(d) | vd |
|---|---|---|---|---|
| 11 | −17.081 | 0.90 | 1.81600 | 46.6 |
| 12 | 54.165 | d12 | | |
| 13 diaphragm | ∞ | 1.00 | | |
| 14 | 53.348 | 2.60 | 1.65160 | 58.5 |
| 15 | −9.540 | 0.90 | 1.90366 | 31.3 |
| 16 | −18.782 | d16 | | |
| 17 | 11.929 | 3.70 | 1.60300 | 65.5 |
| 18 | 24.914 | 0.25 | | |
| 19 | 9.037 | 3.50 | 1.49700 | 81.6 |
| 20 | 69.302 | 1.00 | 1.80610 | 33.3 |
| 21 | 7.737 | 0.55 | | |
| 22 | 13.341 | 3.10 | 1.83481 | 42.7 |
| 23 | −20.699 | 1.00 | | |
| 24 | −9.383 | 1.45 | 1.76200 | 40.1 |
| 25 | −21.077 | 7.00 | | |
| 26 | ∞ | 1.00 | 1.51633 | 64.1 |
| 27 | ∞ | — | | |

TABLE 14

ZOOM LENS SYSTEM DATA
Zoom Ratio: 2.85

| | Short Focal Length Extremity | Intermediate Focal Length | Long Focal Length Extremity |
|---|---|---|---|
| FNO. | 2.9 | 3.0 | 3.0 |
| f | 15.45 | 26.00 | 44.00 |
| W | 17.5 | 10.2 | 5.9 |
| Y | 4.65 | 4.65 | 4.65 |
| fB | 4.90 | 4.90 | 4.90 |
| L | 70.58 | 70.58 | 70.58 |
| d5 | 2.60 | 9.43 | 13.89 |
| d12 | 7.30 | 5.38 | 1.57 |
| d16 | 6.83 | 1.92 | 1.27 |

TABLE 15

LENS GROUP DATA

| Lens Group | 1st Surf. | Focal Length |
|---|---|---|
| 1 | 1 | 36.86 |
| 2 | 6 | −7.85 |
| 3 | 14 | 29.59 |
| 4 | 17 | 19.00 |

Sixth Numerical Embodiment

Figure 31:
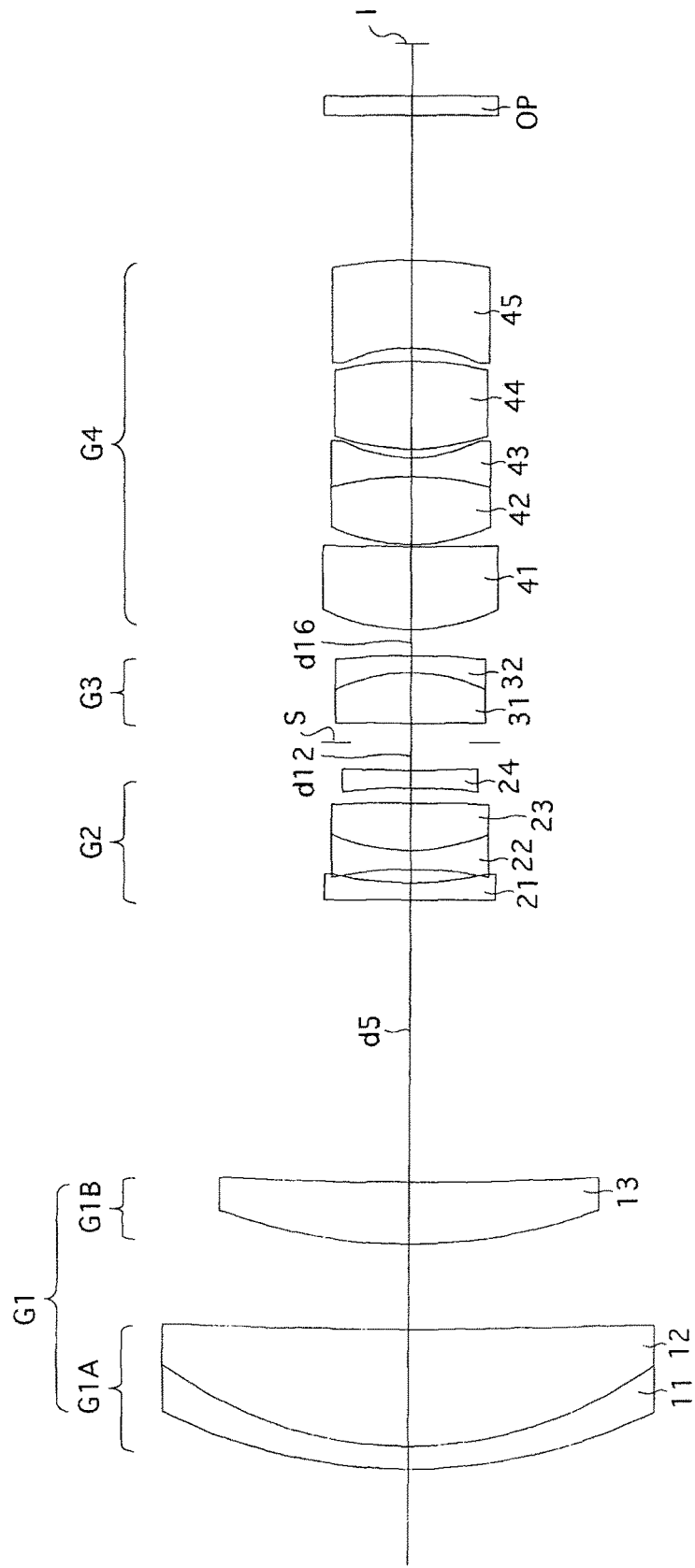
FIG. 31 shows a lens arrangement of a sixth numerical embodiment of a zoom lens system, according to the present invention, at the long focal length extremity when focused on an object at infinity.
Figure 34:
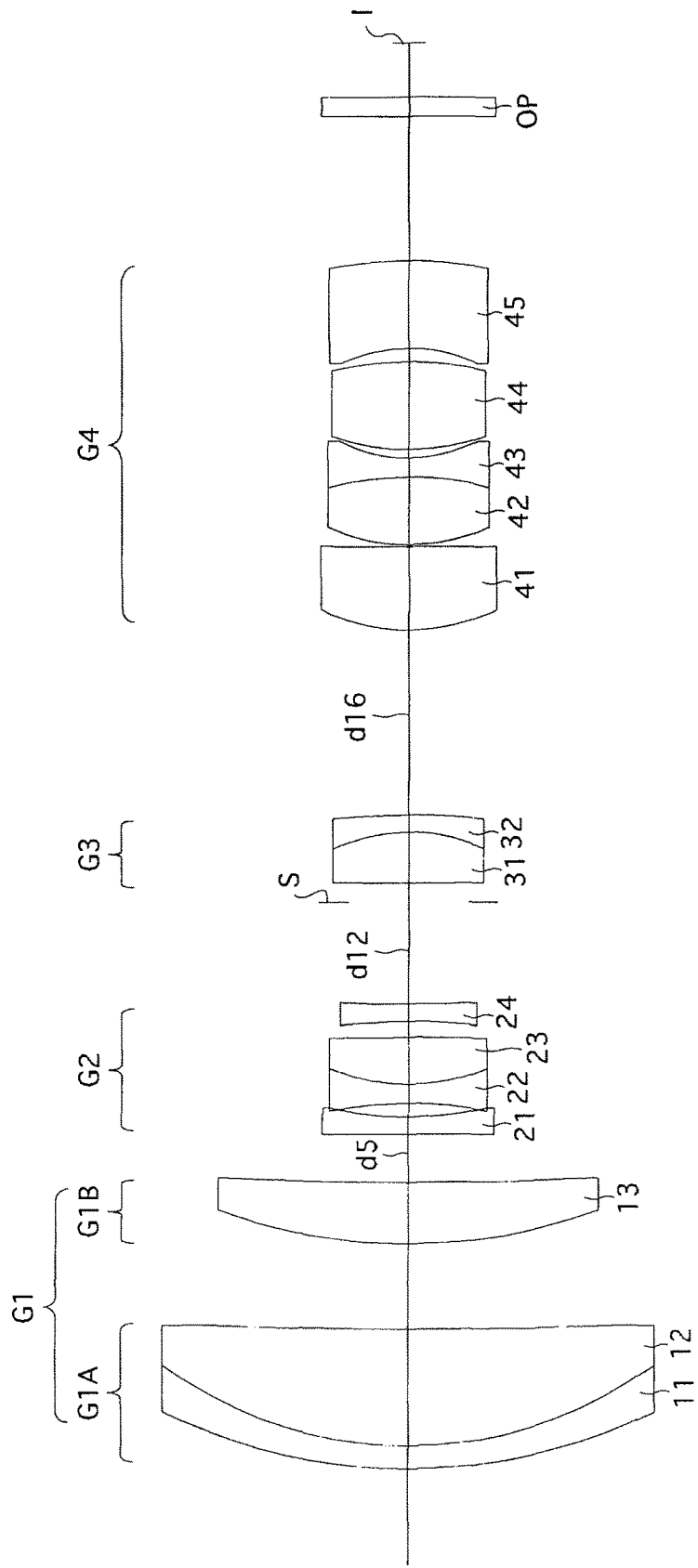
FIG. 34 shows a lens arrangement of the sixth numerical embodiment of the zoom lens system, according to the present invention, at the short focal length extremity when focused on an object at infinity.
Figures 35A, 35B, 35C, 35D:
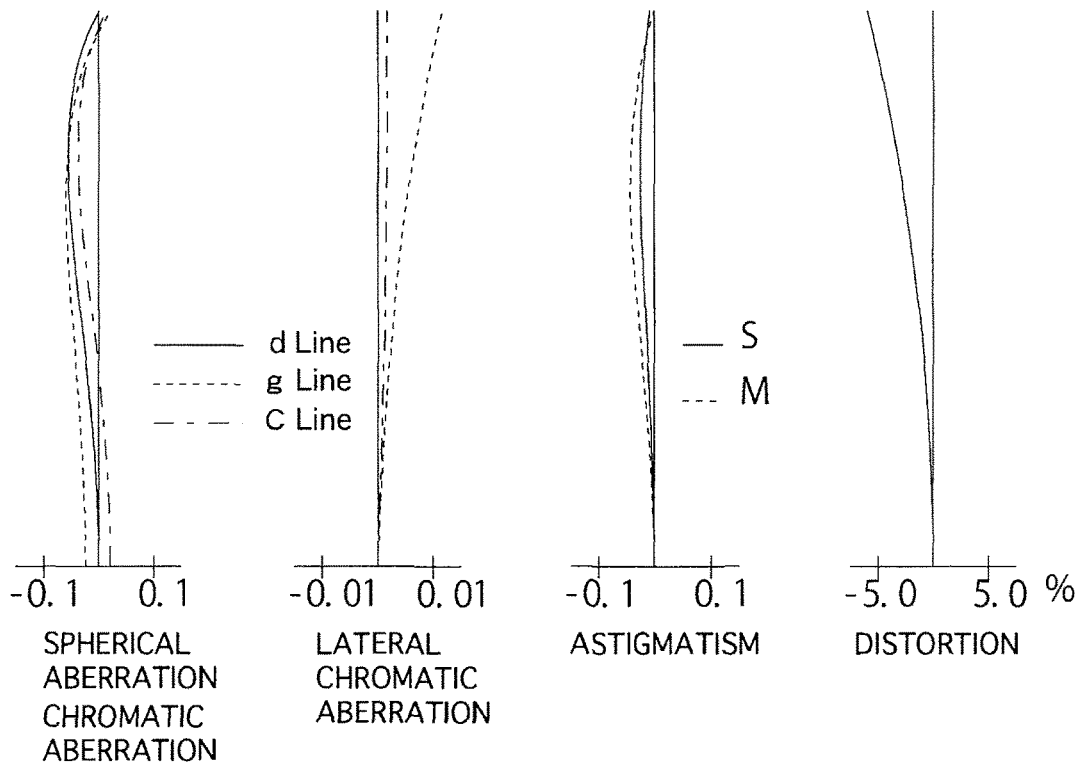
FIGS. 35A, 35B, 35C and 35D show various aberrations that occurred in the lens arrangement shown in FIG. 34.
Figure 36A:
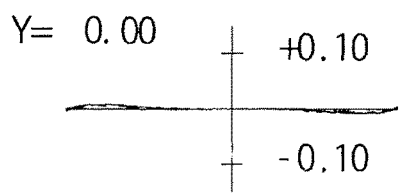
FIGS. 36A, 36B and 36C show lateral aberrations that occurred in the lens arrangement shown in FIG. 34.
Figure 36B:
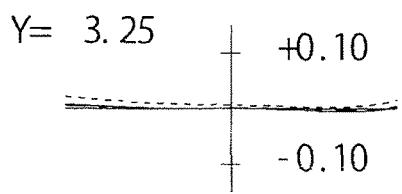
Figure 36C:
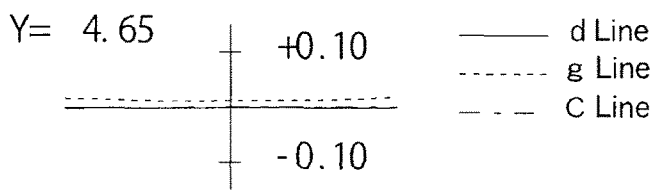

FIGS. 31 through 36C and Tables 16 through 18 show a sixth numerical embodiment of a zoom lens system according to the present invention. FIG. 31 shows a lens arrangement of the sixth numerical embodiment of the zoom lens system at the long focal length extremity when focused on an object at infinity. FIGS. 32A, 32B, 32C and 32D show various aberrations that occurred in the lens arrangement shown in FIG. 31. FIGS. 33A, 33B and 33C show lateral aberrations that occurred in the lens arrangement shown in FIG. 31. FIG. 34 shows a lens arrangement of the sixth numerical embodiment of the zoom lens system at the short focal length extremity when focused on an object at infinity. FIGS. 35A, 35B, 35C and 35D show various aberrations that occurred in the lens arrangement shown in FIG. 34. FIGS. 36A, 36B and 36C show lateral aberrations that occurred in the lens arrangement shown in FIG. 34. Table 16 shows the lens surface data, Table 17 shows various data of the zoom lens system, and Table 18 shows various data of the lens groups according to the sixth numerical embodiment of the present invention.

The lens arrangement of the sixth numerical embodiment is the same as that of the first numerical embodiment except for the following points:

(1) The negative lens element 21 of the second lens group G2 is configured of a negative planoconcave lens element having a concave surface on the image side;

(2) The negative lens element 22 of the second lens group G2 is configured of a negative biconcave lens element;

(3) The positive lens element 23 of the second lens group G2 is configured of a positive biconvex lens element;

(4) The positive lens element 42 of the fourth lens group G4 is configured of a positive biconvex lens element; and (5) The negative lens element 43 of the fourth lens group G4 is configured of a negative biconcave lens element.

TABLE 16

SURFACE DATA

| Surf. No. | r | d | N(d) | vd |
|---|---|---|---|---|
| 1 | 28.808 | 1.20 | 1.80810 | 22.8 |
| 2 | 21.433 | 6.10 | 1.49700 | 81.6 |
| 3 | 279.429 | 4.42 | | |
| 4 | 28.951 | 3.20 | 1.49700 | 81.6 |
| 5 | 199.646 | d5 | | |
| 6 | ∞ | 0.90 | 1.81600 | 46.6 |
| 7 | 17.532 | 0.70 | | |
| 8 | −21.241 | 1.00 | 1.77250 | 49.6 |
| 9 | 10.612 | 2.45 | 1.84666 | 23.8 |
| 10 | −139.010 | 0.80 | | |
| 11 | −32.989 | 0.90 | 1.81600 | 46.6 |
| 12 | 74.911 | d12 | | |
| 13 diaphragm | ∞ | 1.00 | | |
| 14 | 175.856 | 2.65 | 1.76200 | 40.1 |
| 15 | −9.259 | 0.90 | 1.85026 | 32.3 |
| 16 | −37.092 | d16 | | |
| 17 | 10.392 | 4.35 | 1.62041 | 60.3 |
| 18 | 344.176 | 0.10 | | |
| 19 | 9.997 | 3.50 | 1.49700 | 81.6 |
| 20 | −16.204 | 1.00 | 1.79952 | 42.2 |
| 21 | 7.766 | 0.45 | | |
| 22 | 12.117 | 4.55 | 1.83481 | 42.7 |
| 23 | −18.232 | 0.70 | | |
| 24 | −8.477 | 4.55 | 1.80518 | 25.4 |
| 25 | −22.810 | 7.43 | | |
| 26 | ∞ | 1.00 | 1.51633 | 64.1 |
| 27 | ∞ | — | | |

TABLE 17

ZOOM LENS SYSTEM DATA
Zoom Ratio: 2.88

| | Short Focal Length Extremity | Intermediate Focal Length | Long Focal Length Extremity |
|---|---|---|---|
| FNO. | 2.9 | 3.4 | 3.5 |
| f | 15.45 | 26.00 | 44.55 |
| W | 17.7 | 10.3 | 5.9 |
| Y | 4.65 | 4.65 | 4.65 |
| fB | 2.74 | 2.74 | 2.74 |
| L | 73.98 | 73.98 | 73.98 |
| d5 | 2.50 | 9.56 | 14.67 |
| d12 | 5.31 | 5.36 | 1.40 |
| d16 | 9.59 | 2.49 | 1.33 |

TABLE 18

LENS GROUP DATA

| Lens Group | 1st Surf. | Focal Length |
|---|---|---|
| 1 | 1 | 39.85 |
| 2 | 6 | -8.77 |
| 3 | 14 | 56.52 |
| 4 | 17 | 16.10 |

Seventh Numerical Embodiment

Figure 37:
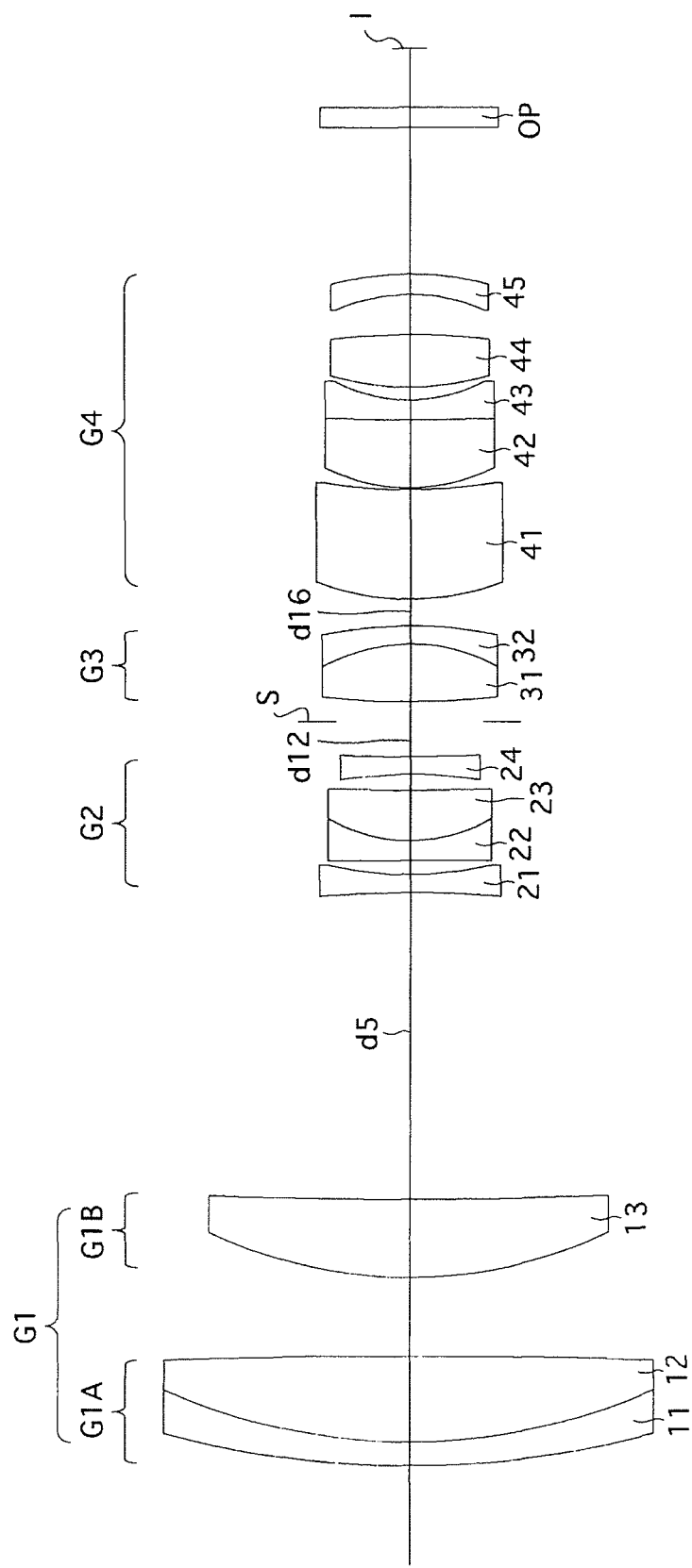
FIG. 37 shows a lens arrangement of a seventh numerical embodiment of a zoom lens system, according to the present invention, at the long focal length extremity when focused on an object at infinity.
Figure 40:
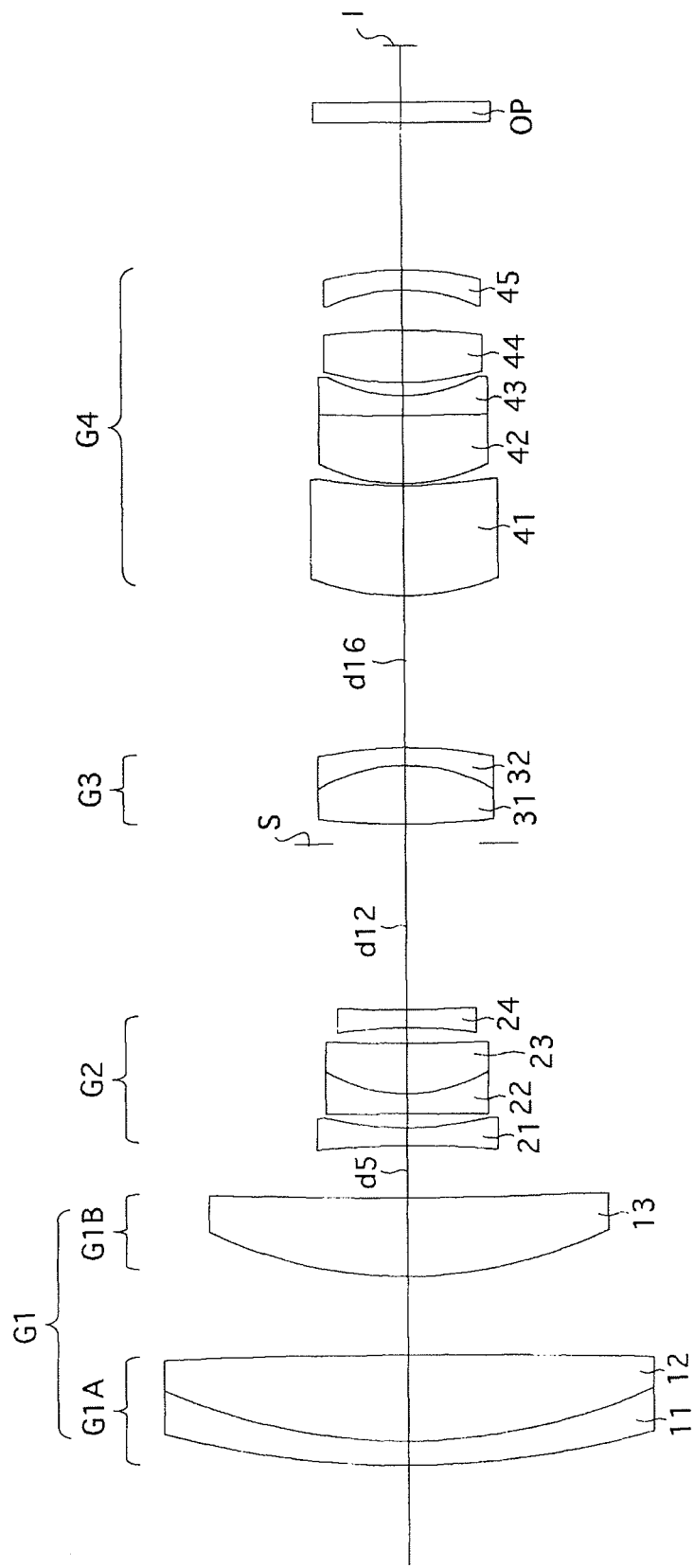
FIG. 40 shows a lens arrangement of the seventh numerical embodiment of the zoom lens system, according to the present invention, at the short focal length extremity when focused on an object at infinity.
Figures 41A, 41B, 41C, 41D:
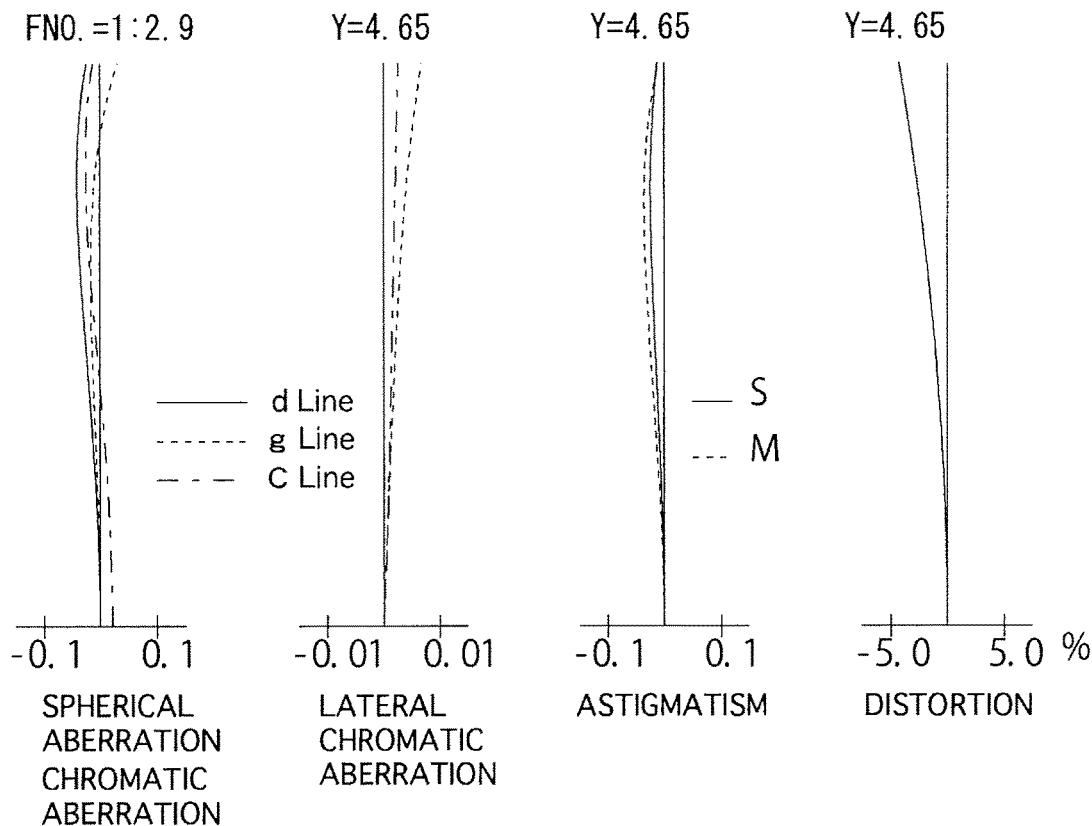
FIGS. 41A, 41B, 41C and 41D show various aberrations that occurred in the lens arrangement shown in FIG. 40.
Figure 42A:
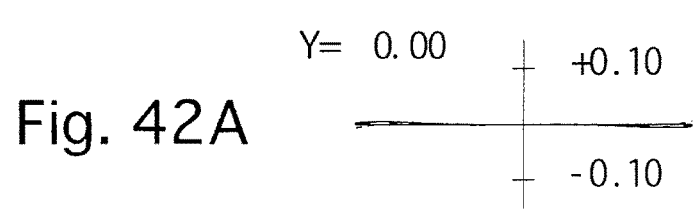
FIGS. 42A, 42B and 42C show lateral aberrations that occurred in the lens arrangement shown in FIG. 40.
Figure 42B:
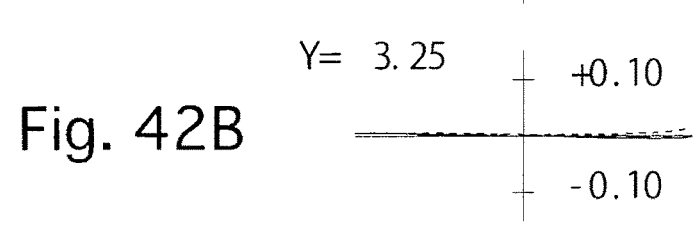
Figure 42C:
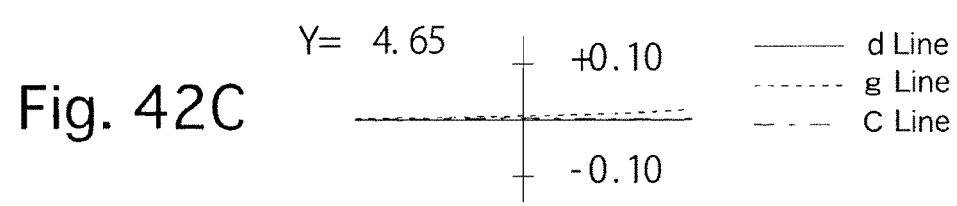

FIGS. 37 through 42C and Tables 19 through 21 show a seventh numerical embodiment of a zoom lens system according to the present invention. FIG. 37 shows a lens arrangement of the seventh numerical embodiment of the zoom lens system at the long focal length extremity when focused on an object at infinity. FIGS. 38A, 38B, 38C and 38D show various aberrations that occurred in the lens arrangement shown in FIG. 37. FIGS. 39A, 39B and 39C show lateral aberrations that occurred in the lens arrangement shown in FIG. 37. FIG. 40 shows a lens arrangement of the seventh numerical embodiment of the zoom lens system at the short focal length extremity when focused on an object at infinity. FIGS. 41A, 41B, 41C and 41D show various aberrations that occurred in the lens arrangement shown in FIG. 40. FIGS. 42A, 42B and 42C show lateral aberrations that occurred in the lens arrangement shown in FIG. 40. Table 19 shows the lens surface data, Table 20 shows various data of the zoom lens system, and Table 21 shows various data of the lens groups according to the seventh numerical embodiment of the present invention.

The lens arrangement of the seventh numerical embodiment is the same as that of the first numerical embodiment except for the following points:

(1) The positive lens element 12 of the first lens group G1 (the first sub lens group G1A) is configured of a positive biconvex lens element; and (2) The negative lens element 22 of the second lens group G2 is configured of a negative biconcave lens element.

TABLE 19

SURFACE DATA

| Surf. No. | r | d | N(d) | vd |
|---|---|---|---|---|
| 1 | 47.193 | 1.20 | 1.80810 | 22.8 |
| 2 | 30.335 | 4.30 | 1.49700 | 81.6 |
| 3 | -443.863 | 3.91 | | |
| 4 | 23.306 | 3.90 | 1.49700 | 81.6 |
| 5 | 230.761 | d5 | | |
| 6 | -55.437 | 0.90 | 1.81600 | 46.6 |
| 7 | 17.822 | 0.70 | | |
| 8 | -1676.358 | 1.00 | 1.77250 | 49.6 |
| 9 | 8.220 | 2.50 | 1.84666 | 23.8 |
| 10 | 94.632 | 0.80 | | |
| 11 | -22.977 | 0.90 | 1.81600 | 46.6 |
| 12 | 83.527 | d12 | | |
| 13 diaphragm | ∞ | 1.00 | | |
| 14 | 40.633 | 2.90 | 1.69680 | 55.5 |
| 15 | -9.045 | 0.90 | 1.85026 | 32.3 |
| 16 | -21.935 | d16 | | |
| 17 | 12.845 | 5.50 | 1.59240 | 68.3 |
| 18 | 26.655 | 0.10 | | |
| 19 | 9.600 | 3.40 | 1.49700 | 81.6 |
| 20 | 159.172 | 1.00 | 1.80610 | 33.3 |
| 21 | 8.174 | 0.65 | | |
| 22 | 14.881 | 2.60 | 1.83481 | 42.7 |
| 23 | -34.835 | 2.00 | | |
| 24 | -9.404 | 1.00 | 1.71300 | 53.9 |

TABLE 19-continued

SURFACE DATA

| Surf. No. | r | d | N(d) | vd |
|---|---|---|---|---|
| 25 | -16.184 | 7.27 | | |
| 26 | ∞ | 1.00 | 1.51633 | 64.1 |
| 27 | ∞ | — | | |

TABLE 20

ZOOM LENS SYSTEM DATA
Zoom Ratio: 2.80

| | Short Focal Length Extremity | Intermediate Focal Length | Long Focal Length Extremity |
|---|---|---|---|
| FNO. | 2.9 | 2.9 | 2.9 |
| f | 15.45 | 26.00 | 43.30 |
| W | 17.4 | 10.2 | 6.0 |
| Y | 4.65 | 4.5 | 4.65 |
| fB | 2.96 | 2.96 | 2.96 |
| L | 70.81 | 70.81 | 70.81 |
| d5 | 2.60 | 10.60 | 15.36 |
| d12 | 8.25 | 5.80 | 1.73 |
| d16 | 7.57 | 2.02 | 1.32 |

TABLE 21

LENS GROUP DATA

| Lens Group | 1st Surf. | Focal Length |
|---|---|---|
| 1 | 1 | 38.18 |
| 2 | 6 | -8.56 |
| 3 | 14 | 26.11 |
| 4 | 17 | 23.06 |

The numerical values of each condition for each embodiment are shown in Table 22.

TABLE 22

| | $1^{st}$ Embod. | $2^{nd}$ Embod. | $3^{rd}$ Embod. | $4^{th}$ Embod. |
|---|---|---|---|---|
| Cond. (1) | 1.62 | 2.09 | 2.09 | 2.49 |
| Cond. (2) | -3.72 | -5.00 | -3.06 | -7.00 |
| Cond. (3) | 1.41 | 2.29 | 1.49 | 4.44 |
| Cond. (4) | -0.38 | -0.46 | -0.49 | -0.64 |
| Cond. (5) | 94.94 | 81.55 | 81.55 | 94.96 |
| Cond. (6) | 1.61800 | 1.61800 | 1.62041 | 1.64000 |
| Cond. (7) | 1.74077 | 1.74077 | 1.77250 | 1.72916 |
| Cond. (8) | 22.76 | 22.76 | 22.76 | 22.76 |

| | $5^{th}$ Embod. | $6^{th}$ Embod. | $7^{th}$ Embod. |
|---|---|---|---|
| Cond. (1) | 1.94 | 2.48 | 1.66 |
| Cond. (2) | -3.77 | -6.44 | -3.05 |
| Cond. (3) | 1.56 | 3.51 | 1.13 |
| Cond. (4) | -0.41 | -0.55 | -0.37 |
| Cond. (5) | 81.55 | 81.55 | 81.55 |
| Cond. (6) | 1.60300 | 1.62041 | 1.59240 |
| Cond. (7) | 1.76200 | 1.80518 | 1.71300 |
| Cond. (8) | 22.76 | 22.76 | 22.76 |

As can be understood from the above explanation and the aberration diagrams, the aberrations of the first through seventh embodiments are well corrected in spite of relatively few number of lens elements.

Obvious changes may be made in the specific embodiments of the present invention described herein, such modifications being within the spirit and scope of the invention claimed. It is indicated that all matter contained herein is illustrative and does not limit the scope of the present invention.

What is claimed:

1. A zoom lens system comprising a positive first lens group, a negative second lens group, a positive third lens group, and a positive fourth lens group, in that order from an object side, wherein upon zooming from a short focal length extremity to a long focal length extremity, said first lens group does not move along an optical axis relative to an imaging plane, and said second lens group and said third lens group are movable along the optical axis;

wherein said first lens group consists of a positive first sub lens group which does not move along the optical axis during focusing, and a positive second sub lens group including a focusing lens group which moves in order to perform a focusing operation, wherein said first sub lens group consists of a negative lens element and a positive lens element, and wherein the following conditions are satisfied:

$$vd1n<22.85,$$

and $$80<vd4p\leq94.96,$$

wherein vd1n designates an Abbe number, with respect to the d-line, of said negative lens element, which is provided within said first sub lens group, and vd4p designates an Abbe number, with respect to the d-line, of at least one positive lens element in said fourth lens group.

2. The zoom lens system according to claim 1, wherein the following condition is satisfied:

$$1.56<Nd4p\leq1.64$$

wherein

Nd4p designates a refractive index at the d-line of a positive lens element, which is provided closest to the object side within said fourth lens group.

3. The zoom lens system according to claim 1, wherein said fourth lens group comprises at least a negative lens element, and the following condition is satisfied:

$$1.70<Nd4n\leq1.80518,$$

wherein

Nd4n designates a refractive index at the d-line of said negative lens element, which is provided closest to an image side within said fourth lens group.

4. The zoom lens system according to claim 1, wherein the following condition is satisfied:

$$-8.0<f3/f2<-3.0,$$

wherein f2 designates a focal length of said second lens group, and f3 designates a focal length of said third lens group.

5. The zoom lens system according to claim 1, wherein the following condition is satisfied:

$$-0.64\leq f2/f4\leq-0.37,$$

wherein f2 designates a focal length of said second lens group, and f4 designates a focal length of said fourth lens group.

* * * * *